US012545586B2

(12) United States Patent
Bishop et al.

(10) Patent No.: US 12,545,586 B2
(45) Date of Patent: Feb. 10, 2026

(54) COMPOSITES INCLUDING UNIMPREGNATED CELLULAR CARBON NANOSTRUCTURES

(71) Applicant: Dickinson Corporation, Novato, CA (US)

(72) Inventors: Matthew Bishop, Novato, CA (US); Abhay V. Thomas, Novato, CA (US); David Andrew Brill, Novato, CA (US)

(73) Assignee: Dickinson Corporation, Novato, CA (US)

( * ) Notice: Subject to any disclaimer, the term of this patent is extended or adjusted under 35 U.S.C. 154(b) by 179 days.

(21) Appl. No.: 16/493,473

(22) PCT Filed: Mar. 15, 2018

(86) PCT No.: PCT/US2018/022600
§ 371 (c)(1),
(2) Date: Sep. 12, 2019

(87) PCT Pub. No.: WO2018/170241
PCT Pub. Date: Sep. 20, 2018

(65) Prior Publication Data
US 2020/0131040 A1    Apr. 30, 2020

Related U.S. Application Data

(60) Provisional application No. 62/471,711, filed on Mar. 15, 2017.

(51) Int. Cl.
*C01B 32/18* (2017.01)
*C08K 3/04* (2006.01)
(Continued)

(52) U.S. Cl.
CPC .............. *C01B 32/18* (2017.08); *C08K 3/046* (2017.05); *C09D 7/63* (2018.01); *C09D 7/65* (2018.01);
(Continued)

(58) Field of Classification Search
CPC ......... C01B 32/15; C01B 32/18; C08K 3/046; C09D 7/63; C09D 7/65
See application file for complete search history.

(56) References Cited

U.S. PATENT DOCUMENTS

| 4,832,870 A | 5/1989 | Clough et al. |
| 5,908,715 A | 6/1999 | Liu et al. |

(Continued)

FOREIGN PATENT DOCUMENTS

| CN | 101304945 A | 11/2008 |
| CN | 101679605 A | 3/2010 |

(Continued)

OTHER PUBLICATIONS

Machine translation of Zhang et al (CN103855413A), publication date Jun. 11, 2014.*

(Continued)

*Primary Examiner* — Jun Li
(74) *Attorney, Agent, or Firm* — Calfee, Halter & Griswold LLP

(57) ABSTRACT

A composite, comprising a binder, the binder comprising one or more of polymeric, metallic, or ceramic, or pyrolytic carbon binder and a nanostructured carbon having a cellular structure. The cellular structure comprises one or more cell walls having a structure formed by a template and one or more cavities. Each cavity is substantially enclosed by the one or more cell walls and substantially unimpregnated by a liquid or solid.

25 Claims, 17 Drawing Sheets

(51) Int. Cl.
    *C09D 7/63*     (2018.01)
    *C09D 7/65*     (2018.01)

(52) U.S. Cl.
    CPC ...... *C01P 2004/03* (2013.01); *C01P 2004/54* (2013.01); *C01P 2006/40* (2013.01)

(56) References Cited

U.S. PATENT DOCUMENTS

| | | | |
|---|---|---|---|
| 6,811,881 | B1 | 11/2004 | Clough |
| 7,419,650 | B2 | 9/2008 | Pierard et al. |
| 7,718,156 | B2 * | 5/2010 | Zhang ............... C01B 32/18 423/447.5 |
| 7,794,683 | B1 | 9/2010 | Forohar et al. |
| 7,935,276 | B2 | 5/2011 | Zhou et al. |
| 8,828,533 | B2 | 9/2014 | Dai et al. |
| 10,214,424 | B2 | 2/2019 | Xu |
| 10,711,783 | B2 | 7/2020 | Monet |
| 10,717,843 | B2 | 7/2020 | Bishop et al. |
| 11,926,528 | B2 | 3/2024 | Bishop et al. |
| 2004/0004212 | A1 | 1/2004 | Crespi et al. |
| 2008/0275150 | A1 | 11/2008 | Miller et al. |
| 2009/0136816 | A1 | 5/2009 | Kang et al. |
| 2009/0220767 | A1 | 9/2009 | Schlogl et al. |
| 2009/0294729 | A1 | 12/2009 | Harada et al. |
| 2010/0178399 | A1 | 7/2010 | Square et al. |
| 2011/0108774 | A1 * | 5/2011 | Blank ............... H10N 10/01 977/734 |
| 2011/0278506 | A1 | 11/2011 | Toyokawa |
| 2012/0027681 | A1 | 2/2012 | Jung et al. |
| 2012/0241688 | A1 | 9/2012 | Hara et al. |
| 2013/0181676 | A1 | 7/2013 | Kourtakis et al. |
| 2013/0214875 | A1 | 8/2013 | Duncan et al. |
| 2014/0141224 | A1 | 5/2014 | Pasquali et al. |
| 2014/0275597 | A1 | 9/2014 | Zhang et al. |
| 2014/0286852 | A1 | 9/2014 | Nicholas et al. |
| 2014/0313636 | A1 | 10/2014 | Tour et al. |
| 2015/0067707 | A1 | 3/2015 | Chin et al. |
| 2016/0027934 | A1 * | 1/2016 | Noyes ............ H01L 31/022425 252/502 |
| 2016/0096334 | A1 | 4/2016 | Sander et al. |
| 2016/0236177 | A1 | 8/2016 | Backov et al. |
| 2017/0008769 | A1 | 1/2017 | Otter et al. |
| 2017/0009045 | A1 * | 1/2017 | Sawa ............... C09C 1/44 |
| 2017/0029819 | A1 | 2/2017 | Mitter et al. |
| 2017/0298191 | A1 | 10/2017 | Bullock et al. |
| 2018/0022307 | A1 | 1/2018 | Zauritz |
| 2018/0105422 | A1 | 4/2018 | Yu et al. |
| 2018/0223073 | A1 | 8/2018 | Bishop et al. |
| 2018/0301696 | A1 * | 10/2018 | Barker ............... B01J 13/04 |
| 2018/0312406 | A1 * | 11/2018 | Siedle ............... C08K 9/04 |
| 2020/0013104 | A1 | 1/2020 | Yamauchi et al. |
| 2020/0131040 | A1 | 4/2020 | Bishop et al. |
| 2020/0346934 | A1 | 11/2020 | Thomas et al. |
| 2021/0171353 | A1 | 6/2021 | Gulas et al. |
| 2021/0214520 | A1 | 7/2021 | Bishop et al. |

FOREIGN PATENT DOCUMENTS

| | | | | |
|---|---|---|---|---|
| CN | 101687646 | A | | 3/2010 |
| CN | 103086365 | A | | 5/2013 |
| CN | 103395767 | A | | 11/2013 |
| CN | 103482611 | A | | 1/2014 |
| CN | 103855413 | A | * | 6/2014 |
| CN | 104269543 | A | | 1/2015 |
| CN | 104961119 | A | | 10/2015 |
| CN | 102936008 | B | * | 3/2016 |
| CN | 107082410 | A | * | 8/2017 ............ B82Y 30/00 |
| CN | 109734081 | A | | 5/2019 |
| CN | 111278768 | A | | 6/2020 |
| EP | 3312225 | A1 | | 6/2016 |
| FR | 1087068 | A | | 2/1955 |
| JP | S63264812 | A | | 11/1988 |
| JP | 2006335596 | A | | 12/2006 |
| JP | 2008535763 | A | | 9/2008 |
| JP | 2009007216 | A | | 1/2009 |
| JP | 2009132607 | A | | 6/2009 |
| JP | 2009538363 | A | | 11/2009 |
| JP | 2010007061 | A | * | 1/2010 |
| JP | 2010007067 | A | | 1/2010 |
| JP | 2010208887 | A | | 9/2010 |
| JP | 2011525468 | A | | 9/2011 |
| JP | 2012201689 | A | | 10/2012 |
| JP | 2013166849 | A | | 8/2013 |
| JP | WO2015137221 | A1 | * | 4/2017 |
| JP | 2020509147 | A | | 3/2023 |
| KR | 20150020156 | A | | 2/2015 |
| WO | 2006108683 | A1 | | 10/2006 |
| WO | 2007143237 | A2 | | 12/2007 |
| WO | WO-2009149540 | A1 | * | 12/2009 ............ A61K 47/02 |
| WO | WO-2012138803 | A2 | * | 10/2012 ............ B82Y 30/00 |
| WO | 2012174040 | A1 | | 12/2012 |
| WO | 2014026194 | A1 | | 2/2014 |
| WO | 2016208170 | A1 | | 12/2016 |
| WO | WO-2017029920 | A1 | * | 2/2017 ............ B01J 21/063 |
| WO | 2018136810 | A1 | | 7/2018 |
| WO | 2018170241 | A1 | | 9/2018 |
| WO | 2019083986 | A1 | | 5/2019 |
| WO | 2019149540 | A1 | | 8/2019 |
| WO | 2020004674 | A1 | | 1/2020 |
| WO | 2021257566 | A1 | | 12/2021 |

OTHER PUBLICATIONS

Mechanical properties and toughness of carbon aerogel/epoxy polymer composites, J. Mater Sci (2015), 50:3258-3266.*

Davydov et al., Preparation of a Platelike Carbon Nanomaterial Using MgO as a Template; Neorganicheskie Materialy, 2012, vol. 48, No. 3, pp. 297-301.*

Machine translation of Watanabe (JP2010007061A), publication date Jan. 2010.*

Office Action from Canadian Application No. 3,079,947 dated Oct. 28, 2024.

Office Action from Chinese Application No. 201880069707.4 dated Dec. 5, 2022.

Office Action from European Application No. 18821140.2 dated Jan. 30, 2023.

Office Action from European Application No. 18871140.2 dated Jan. 20, 2022.

Office Action from Indian Application No. 202047021556 dated Dec. 17, 2020.

Office Action from Japanese Application No. 2020543477 dated Aug. 29, 2022.

Office Action from Chinese Application No. 201880024901 dated Aug. 31, 2022.

Office Action from Japanese Patent Application No. 2019550644 dated Sep. 26, 2022.

Office Action from Japanese Patent Application No. 2023115215 dated Jun. 19, 2024.

Office Action from Australian Patent Application No. 2021293887 dated Oct. 25, 2023.

Office Action from Australian Patent Application No. 2021344831 dated Apr. 10, 2025.

Office Action from Korean Patent Application No. 1020237001670 Mar. 26, 2025.

Office Action from Japanese Patent Application No. 2023115215 dated Mar. 3, 2025.

Office Action from Indian Patent Application No. 202317002398 dated Mar. 18, 2025.

Office Action from Indian Patent Application No. 202317047095 dated Apr. 3, 2025.

Pawan, et al. "A simple "nano-templating" method using zeolite Y toward the formation of carbon schwarzites." Frontiers in Materials 6 (2019): 104.

Reilly, Peter TA, and William B. Whitten. "The role of free radical condensates in the production of carbon nanotubes during the hydrocarbon CVD process." Carbon 44.9 (2006): 1653-1660.

Robertson AW, Bachmatiuk A, Wu YA, Schäffel F, Rellinghaus B, Büchner B, Rümmeli MH, Warner JH. "Atomic structure of interconnected few-layer graphene domains." ACS nano. Aug. 5, 2011;5(8):6610-8.

(56) References Cited

OTHER PUBLICATIONS

Ruffieux et al., On-Surface Synthesis of Graphene Nanoribbons with Zigzag Edge Topology, Nature, pp. 489-493, vol. 531, Mar. 24, 2016.
Search Report from European Application No. 18871140.2 dated Jun. 21, 2021.
Son, In Hyuk, "Silicon carbide-free graphene growth on silicon for lithium-ion battery with high volumetric energy density", Nature Communications, Jun. 25, 2015.
Sun, Yanqiu, et al. "Structural dislocations in anthracite." The Journal of Physical Chemistry Letters 2.20 (2011): 2521-2524.
Tuan, Dinh Van, "Insulating behavior of an amorphous graphene membrane", Physical Review B86, 121408(R), 2012.
Vilian, A.T. Ezhil, "Pt-Au bimetallic nanoparticles decorated on reduced graphene oxide as an excellent electrocatalysts for methanol oxidation", Synthetic metals 219, 2016, pp. 52-59.
Wagner, Daniel Hanoch, "Stress-Induced Fragmentation of Multi-Walled Carbon Nanotubes in a Polymer Matrix", Applied Physics Letters, Jan.
Wang, Guoxiu, "Sn/graphene nanocomposite with 3D architecture for enhanced reversible lithium storage in lithium ion batteries", Journal of Materials Chemistry, 2009, 19, pp. 8378-8384.
"xGnp Graphene nanoplatelets—Grade C", XGSciences, 2 pages.
Zhang et al. "Mussel-Inspired Polydopamine Coated Hollow Carbon Microspheres, a Novel Versatile Filler for Fabrication of High Performance Syntactic Foams", ACS Applied Materials & Interfaces, vol. 6, No. 21, Oct. 15, 2014, pp. 18644-18652.
Zhao, Jin, et al. "Synthesis of large-scale undoped and nitrogen-doped amorphous graphene on MgO substrate by chemical vapor deposition." Journal of Materials Chemistry 22.37 (2012): 19679-19683.
An et al. "Polypyrolle/Carbon aerogel composite materials for supercapacitator", Journal of Power Sources, vol. 195, No. 19, Oct. 1, 2010, pp. 6964-6969.
Ariga, "Nanoarchitectonics for Mesoporous Materials", Bulletin of the Chemical Society of Japan, vol. 85, No. 1, 1-32, Jan. 2012.
Carpenter, Corinne, "Mechanical properties of irradiated single-layer graphene", Appl. Phys. Lett. 103, 013102, 2013.
Castillejos, Eva, "An Efficient Strategy to Drive Nanoparticles into Carbon Nanotubes and the Remarkable Effect of Confinement on Their Catalytic Performance", Angewandte Chemie, 2009, 48, 2529-2533.
Chandra Kishore S et al: "Direct synthesis of solid and hollow carbon nanospheres over NaCl crystals using acetylene by chemical vapour deposition", Applied Surface Science, Elsevier, Amsterdam, NL, vol. 400, Dec. 14, 2016 (Dec. 14, 2016), pp. 90-96, XP029898989, ISSN: 0169-4332, DOI: 10.1016/J.APSUSC.2016.12.104.
"Chemical vapor infiltration", Wikipedia, 2020, p. 1-5, https://en.wikipedia.org/wiki/windexphp?title=Chemical_vapor_infiltration&oldid=944760299.
Cheng, Hui-Ming, "Shortened double-walled carbon nanotubes by high-energy ball milling", International Journal of Nanotechnology, Jan. 2007.
Cheng, Quian "Graphene and carbon nanotube composite electrodes for supercapacitors with ultra-high energy density", Phys. Chem. Chem Phys., 2011, 13, pp. 17615-17624.
Chien Chun-Hsiung et al: "Synthesis of carbon hollow spheres and particles from CCl4and Mo", Materials Letters, vol. 62, No. 8, pp. 1176-1178, XP029141217, ISSN: 0167-577X, DOI: 10.1016/J.MATLET.2007.08.027.
Choi, Young-Kuk, "Processing and characterization of epoxy nanocomposites reinforced by cup-stacked carbon nanotubes", Polymer 46, 2005, pp. 11489-11498.
Chung, De-Hua, Ta-Hui Lin, and Shuhn-Shyurng Hou. "Flame synthesis of carbon nano-onions enhanced by acoustic modulation." Nanotechnology 21.43 (2010): 435604.
Cui, Chaojie, et al. "Highly electroconductive mesoporous graphene nanofibers and their capacitance performance at 4 V." Journal of the American Chemical Society 136.6 (2014): 2256-2259.

da Silveira, et al., "Functionalized Cellular Carbon-MgO Composites: From Interface Processing to Thermal Shock Resistant Low-Carbon MgO—C Refractories," Advanced Engineering Materials, DOI: 10.1002/adem.201300052, vol. 16, No. 3, XP055467219, pp. 301-308, (Oct. 17, 2013).
da Silveira, et al,. "Reinforced Cellular Carbon Matrix-MgO Composites for High Temperatures Applications: Microstructural Aspects and Colloidal Processing," Advanced Engineering Materials, DOI: 10.1002/adem.201100028, vol. 13, No. 11, XP055467221, pp. 982-989, (May 27, 2011).
Dittanet, Preerapan, "Fracture Behavior of Silica Nanoparticle Filled Epoxy Resisn" (2011). Theses and Dissertations. Paper 1034.
Examination Report from European U.S. Appl. No. 21/826,674 dated Feb. 5, 2024.
Farbos et al. "Nanoscale Structure and texture of highly anisotropic pyrocarbons revisited with transmission electron microscopy, image processing, neutron diffraction and atomistic modeling", Carbon, vol. 80, Sep. 4, 2014, p. 472-489.
Ferrari, Andrea C., and John Robertson. "Interpretation of Raman spectra of disordered and amorphous carbon." Physical review B 61.20 (2000): 14095.
Fetisova O.Yu., Synthesis and Properties of Porous Carbon Materials from Natural Graphites and Anthracites, Dissertation for the Candidate Degree in Chemistry, Krasnoyarsk, 2012 (D3).
Garlof, Svenja, "3D carbon networks and their polymer composites: Fabrication and electromechanical investigations of neat Aerographite and Aerographite-based PNCs under compressive load", Carbon 111, Sep. 20, 2016, pp. 103-112.
Garlof, Svenja, "Electro-mechanical piezoresistive properties of three dimensionally interconnected carbon aerogel (Aerographite)-epoxy composites", Composites Science and Technology 134 (2016) 226-233.
Gojny, Florian H., "Functionalisation effect on the thermo-mechanical behaviour of multi-wall carbon nantube/epoxy-composites", Composites Science and Technology 64, 2004, pp. 2303-2308.
Guo, Chun Xian, "A self-assembled hierarchical nanostructure comprising carbon spheres and graphene nanosheets for enhanced supercapacitor preformance", Energy & Enviromental Science, 2011, pp. 4504-0407.
He et al: "A practical method for the production of hollow carbon onion particles", Journal of Alloys and Compounds, Elsevier Sequoia, Lausanne, CH, vol. 425, No. 1-2, Nov. 3, 2006 (Nov. 3, 2006), pp. 329-333, XP00584 7594, ISSN: 0925-8388, DOI: 10.1016/J.JALLCOM.2006.01.031.
Hodkiewica, Joe, "Characterizing Graphene with Raman Spectroscopy", Thermo Scientific, Application Note: 51946, 2010.
Hsieh et al., Mechanical properties and toughness of carbon aerogel/epoxy polymer composites, Springer Science +Business Media, vol. 50, pp. 3258-3266, 2015.
Huang, Mingyuan, et al. "Raman spectroscopy of graphene under uniaxial stress: Phonon softening and determination of the crystallographic orientation.".
Huang et al.., Thickness of graphene and single-wall carbon nanotubes, The American Physical Society, vol. B, No. 74, pp. 245413-1-245413-9, 2006.
Bo Jin et al., "Inorganic Salt Technology," China Industry Press, pp. 153-157, Aug. 1965.
International Search Report and Written Opinion of the International Searching Authority, or the Declaration for International Application No. PCT/US2018/014549 dated Jul. 6, 2018.
International Search Report and Written Opinion from PCT/US2018/057082 dated Dec. 31, 2018.
International Search Report and Written Opinion from PCT/US2021/37435 dated Sep. 28, 2021.
Lee, Ki Rak, "Electrochemical oxygen reduction on nitrogen doped graphene sheets in acid media" Electrochemistry Communications 12, 2010, pp. 1052-1055.
Li, Xing-ao, et al. "Chemical vapor deposition of amorphous graphene on ZnO film." Synthetic Metals 174 (2013): 50-53.

(56) References Cited

OTHER PUBLICATIONS

Liu, DeHan, et al. "Sample maturation calculated using Raman spectroscopic parameters for solid organics: Methodology and geological applications." Chinese Science Bulletin 58.11 (2013): 1285-1298.

Llu "Graphene-like nanoribbons periodically embedded with four- and eight-membered rings." Nature Comm, 8:14924, pp. 1-7 (Year:2017).

Mecklenburg, Matthias, "Aerographite: Ultra Lightweight, Flexible Nanowall, Carbon Microtube Material with Outstanding Mechanical Performance", Advanced Materials, 2012, 24, 3486-3490.

Misra, Abha, et al. "Hexagonal diamond synthesis on h-GaN strained films." Applied physics letters 89.7 (2006).

Mortazavi, Bohayra, "Amorphized graphene: A stiff material with low thermal conductivity", Carbon 103, 2016, pp. 318-326.

Negishi et al, "Layer-by-Layer Growth of Graphene Layers on Graphene Substrates by Chemical Vapor Deposition," Thin Solid Films, vol. 519 (2011), pp. 6447-6452.

Nestler, Klaus, et al. "Thermogravimetric and Raman spectroscopic investigations on different coals in comparison to dispersed anthracite found in permineralized tree fern Psaronius sp." Journal of Molecular Structure 661 (2003): 357-362.

Nishihara H et al: "A possible buckybowl-like structure of zeolite templated carbon", Carbon, Elsevier Oxford, GB, vol. 47, No. 5, Apr. 1, 2009 (Apr. 1, 2009), pp. 1220-1230, XP025971099, ISSN: 0008-6223, DOI: 10.1016/J.Carbon.2008.12.040.

Oberlin, "Pyrocarbons," Carbon vol. 40, No. 7, Nov. 2001, p. 7-24.

Office Action from Indian Application No. 201947033290 dated Mar. 23, 2021.

Office action from Indian Application No. 201947041276 dated Mar. 24, 2021.

Office Action from Japanese Application No. 2019-560047 dated Dec. 21, 2021.

Office action from Japanese Application No. 2019-550644 dated Dec. 21, 2021.

Office Action from Chinese Application No. 201880019586.2 dated Sep. 1, 2021.

Office Action from Japanese Application No. 2023121698 dated Jul. 24, 2024.

* cited by examiner

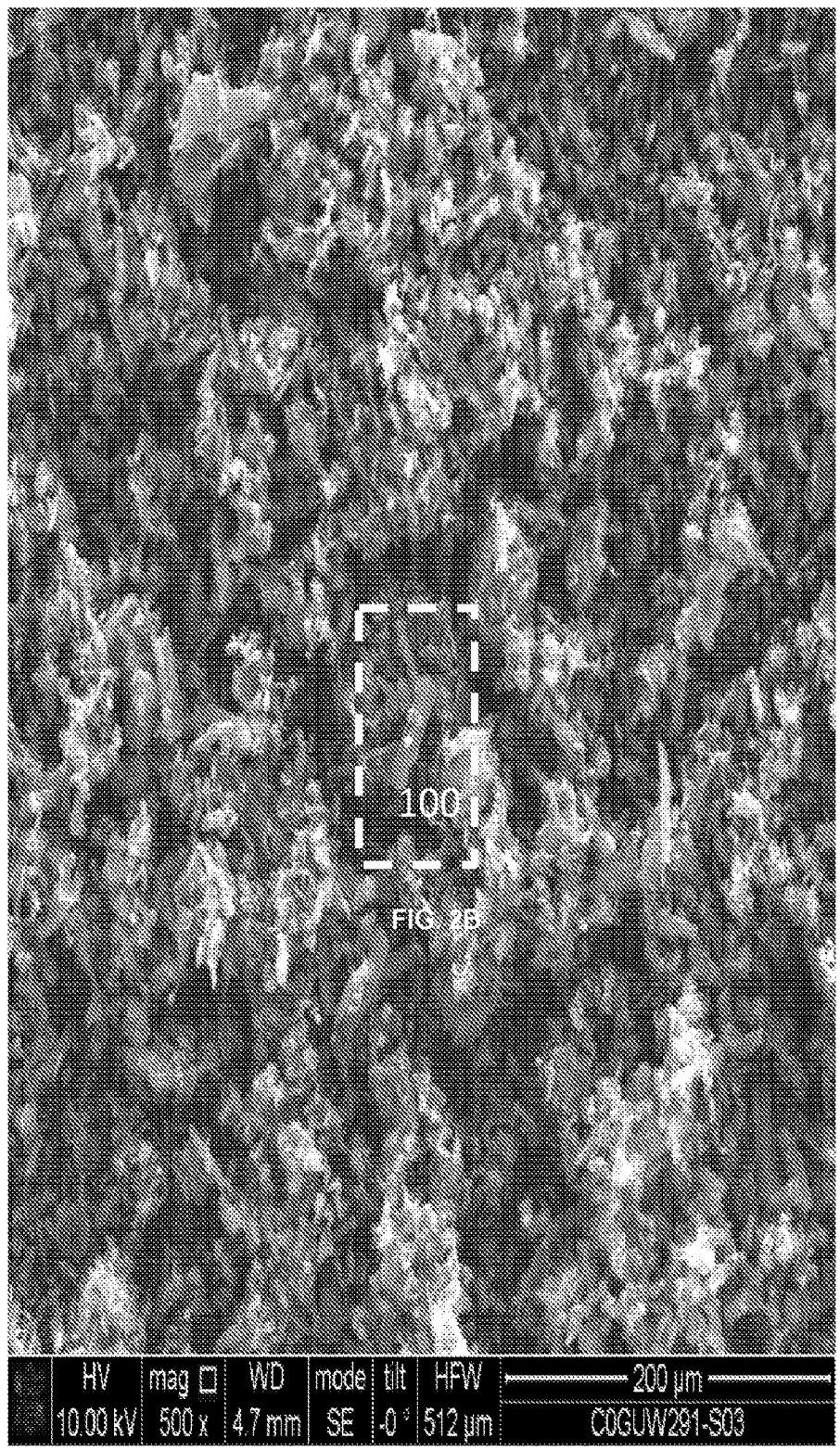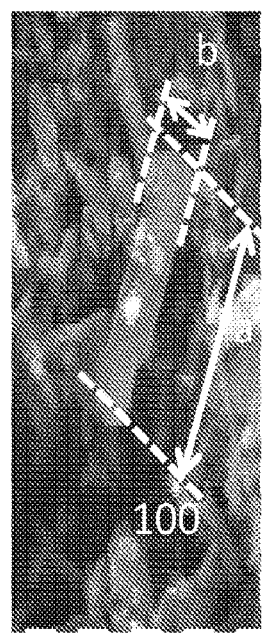
FIG. 2B
FIG. 2A

COMPOSITES INCLUDING UNIMPREGNATED CELLULAR CARBON NANOSTRUCTURES

CROSS-REFERENCE TO RELATED APPLICATIONS

This application claims priority to U.S. Provisional Patent Application Ser. No. 62/471,711 filed Mar. 15, 2017, which is hereby incorporated by reference in its entirety for all purposes. This application is also related to U.S. Provisional Patent Application No. 62/448,129, filed Jan. 19, 2017, now PCT/US18/14549, and U.S. Provisional Patent Applications No. 62/294,751, now PCT/US17/17537, which are also both incorporated by reference in their entirety for all purposes.

BACKGROUND

Nanocomposites, placing nanostructured carbons into larger, heterogeneous structures, have been proposed. In particular, different kinds of $sp^2$-hybridized carbon nanoparticles have been studied extensively because of their potential to improve the structural or electronic properties of composites used in structural, battery, and display technologies. "Zero-dimensional" carbon nanostructures, including Buckminster fullerenes and carbon quantum dots, have been the subject of intense academic activity for decades. So-called "one-dimensional" carbon nanostructures, including carbon nanotubes and nanofibers, have more recently been studied, as have "two-dimensional" carbon nanostructures such as graphene nanoplatelets. The studies of these low-dimensional (i.e. 0D, 1D, or 2D) carbons reveal their extraordinary strength to weight ratios and electronic properties, suggesting that placing them in other materials would create composites with desirable properties. However, particles with low-dimensional geometries often present challenges compared to particles with three-dimensional geometries. For instance, particles with low-dimensional geometries tend to agglomerate or entangle and can be difficult to disperse evenly throughout a matrix.

Carbons with porous structures, on the other hand, have the potential to incorporate the advantageous attributes of low-dimensional particles without the challenges associated with low-dimensional particle geometries. Predictive modeling of 3D objects constructed from 2D grapheme, in particular, show outstanding compressive strength-to-weight ratios. One hypothetical example is the hollow 3D sphere formed by 2D graphene as the spherical surface. Real-world examples include self-assembled graphene aerogels. However, 3D graphene assemblies are difficult to synthesize, and may not have controllable pore morphology. Such assemblies may also be especially well-suited to electrochemical applications due to their porosity and electrical conductivity.

SUMMARY

Described herein is a novel class of composite materials incorporating unimpregnated cellular carbons with templated cavity morphology. Some embodiments include a composite, comprising a binder comprising one or more of polymeric, metallic, or ceramic, or pyrolytic carbon binder and a nanostructured carbon. The nanostructured carbon may comprise one or more cell walls having a structure formed by a template and one or more cavities. Each cavity may be substantially enclosed by the one or more cell walls and substantially unimpregnated by a liquid or solid. A majority of the one or more walls may have a thickness of 100 nm or smaller. A majority of the cavities may have a diameter of 10 nm or larger and an aspect ratio of substantially less than 10:1. A majority of the cellular structures may have a diameter of 1 mm or smaller. The composite may be formed via template-directed chemical vapor deposition.

In some embodiments, the polymeric binder may be a thermoplastic. The thermoplastic may comprise at least one of the following: poly(methyl methacrylate), acrylonitrile butadiene styrene, polyamide, polylactic acid, polybenzimidazole, polycarbonate, polyether sulfone, polyoxymethylene, polyether ether ketone, polyetherimide, polyethylene, polyphenylene oxide, polphenylene sulfide, polypropylene, polystyrene, polyvinyl chloride, polytetrafluoroethylene, or copolymers thereof. The polymeric binder may include a thermosetting polymer. The thermosetting polymer may comprise at least one of the following: polyester, polyurethane, polyurea, phenol-formaldehyde, urea-formaldehyde, epoxy, benzoxazine, polyimide, bismaleimide, polycyanurate, polysiloxane, vinyl ester, or blends thereof.

In some embodiments, the nanostructured carbon may comprise 1%, 10%, 50% or less of the composite by weight. The nanostructured carbon may be non-covalently bonded to the binder. The nanostructured carbon may be electrically conductive.

In some embodiments, the composite may be a powder. The composite may have a density that is substantially less than a density of the binder. The composite may have a density of 0.80 $g/cm^3$ or less. The composite may have a density of 0.50 $g/cm^3$ or less.

In some embodiments, the composite may have a compressive strength at 10% strain that is more than 140% greater than a compressive strength at 10% strain of the binder. The composite may have a compressive strength at 10% strain that is more than 600% greater than a compressive strength at 10% strain of the binder. The composite may have an ultimate tensile strength that is more than 140% greater than an ultimate tensile strength of the binder. The composite may have a compressive modulus that is more than 640% greater than a compressive modulus of the binder. The composite may have a specific strength at 10% strain that is more than 400% greater than a specific strength at 10% strain of the binder. The composite may have a specific strength at 10% strain that is more than 790% greater than a specific strength at 10% strain of the binder. The composite may have a specific ultimate compressive strength that is more than 400% greater than a specific ultimate compressive strength of the binder. The composite may have a specific ultimate compressive strength that is more than 790% greater than a specific ultimate compressive strength of the binder. The composite may have a specific modulus that is more than 470% greater than a specific modulus of the binder. The composite may have a specific modulus that is more than 810% greater than a specific modulus of the binder.

Some embodiments include film or coating, comprising a binder comprising one or more of polymeric, metallic, or ceramic, or pyrolytic carbon binder and a nanostructured carbon. The nanostructured carbon may comprise one or more walls having a structure formed by a template and one or more cavities. Each cavity may be substantially enclosed by the one or more walls and substantially unimpregnated by a liquid or solid. A majority of the one or more cell walls may have a thickness of 100 nm or smaller. A majority of the cavities may have a diameter of 10 nm or larger and an aspect ratio of substantially less than 10:1. A majority of the cellular structures may have a diameter of 1 mm or smaller.

Still more embodiments include a molded casting, comprising a binder comprising one or more of polymeric, metallic, or ceramic, or pyrolytic carbon binder and a nanostructured carbon having a structure. The nanostructured carbon may comprise one or more walls having a structure formed by a template and one or more cavities. Each cavity may be substantially enclosed by the one or more walls and substantially unimpregnated by a liquid or solid. A majority of the one or more cell walls may have a thickness of 100 nm or smaller. A majority of the cavities may have a diameter of 10 nm or larger and an aspect ratio of substantially less than 10:1. A majority of the cellular structures may have a diameter of 1 mm or smaller.

Related PCT/US18/145 describes a 3D nanocomposite network with both 2D and 3D features in which templated carbon morphologies are utilized to impose controllable spacing between 2D carbon features. These features include cells and cavities in the carbon material that are formed via template-directed synthesis. Herein "cell" will be used to refer to a templated carbon structure containing an internal cavity. Cells may be present in either the carbon powder (e.g., S1-S3) or as embedded structures in composite (e.g., C1 and C2) materials. Cells generally inherit morphological properties from the template used to form them. Nanocomposites incorporated them, therefore, are referred to herein as "cellular carbon" nanocomposites. The cells impart a 3D structure with controllable spacing. In PCT/US18/145, the cells are "impregnated," or filled, by a liquid or solid material that alters the properties of the composite. Impregnation of the cells with solid or liquid material may be deliberate. It also may also occur inadvertently. For example, cells may become impregnated due to infiltration of a liquid through pores or breaches in the cell wall.

"Unimpregnated" cellular composites, or composites with cells filled with gas or voids instead of solid or liquid material, have the potential to offer even more advantageous strength to weight ratios. Specifically, unimpregnated cellular composites may offer the structural rigidity of the cellular carbon framework while their gas- or void-filled cell structure simultaneously reduces its weight and density.

The composite materials described herein may possess a range of carbon weight fractions (e.g., from less than 1% to greater than 50%). The cells may be dispersed throughout the matrix. Alternatively, they may be packed densely throughout the matrix. The composites may take the form of powders, granulated powders, pellets, or liquid dispersions. The composites may be molded, coated, or printed.

One aspect is to provide a new class of composite materials with enhanced physical, mechanical, electrical, and thermal properties, and that may be fabricated into components using a number of manufacturing methods.

In addition to lowering density, unimpregnated cellular carbons may provide advantages over impregnated cellular carbons for nanocomposite applications, in particular. For example, unimpregnated cellular carbons may have more freedom to flex and to absorb kinetic energy than nanocomposites comprised of impregnated cell architectures. Unimpregnated carbons may also exhibit a lower electron scatter profile and lower electrical resistance, providing advantages for electrical nanocomposite applications. High-porosity unimpregnated cellular carbons may also be engineered to reduce the thermal conductivity in applications where thermal insulation is desirable. Additional advantages and applications will be readily apparent to those skilled in the art from the following detailed description.

BRIEF DESCRIPTION OF THE FIGURES

The accompanying drawings, which are incorporated herein and constitute part of this specification, illustrate examples, and together with the general description given above and the detailed description given below, serve to explain the features of the disclosed systems and methods.

FIG. 2A is an SEM micrograph showing the cellular carbon particles of S1 carbon powder.

FIG. 2B is a magnification of an S1 particle 100 shown in FIG. 1D to allow calculation of that particle's aspect ratio.

FIG. 2D is a higher magnification of a portion of FIG. 2B showing cell walls 120a.

FIG. 9B is a magnified image of one of the cells in FIG. 9A.

DETAILED DESCRIPTION

Figure 1A:
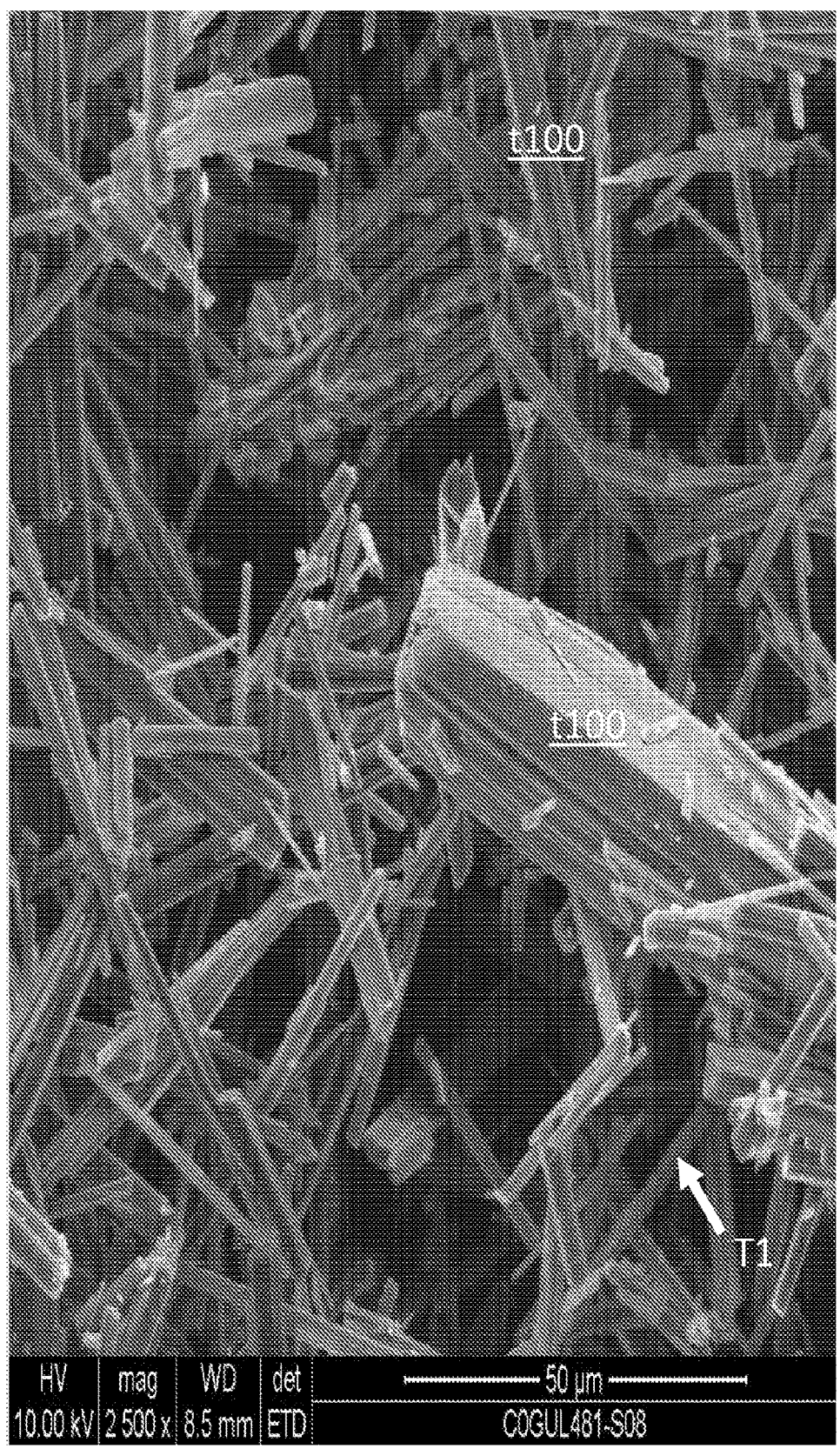
FIG. 1A is a Scanning Electron Microscopy (SEM) micrograph of a nesquehonite template precursor.

The examples and descriptions herein are to be regarded as illustrative in nature and not restrictive. Although particular exemplary methods of preparing the cellular carbon powder precursor materials and composites are described herein, it is to be understood that the instant disclosure is not limited to such methods of preparation. It is to be understood that the cellular carbons may be prepared according to any method disclosed herein, as well as any of the methods described in PCT/US18/14549 and PCT/US17/17537, both of which are incorporated by reference.

The following disclosure describes embodiment composites and methods of manufacturing exemplary cellular carbon powders. Cellular carbon powders may be synthesized via template-directed chemical vapor deposition ("CVD") in an MTI rotary tube furnace outfitted with having an outer diameter ("OD") of 100 mm stainless steel flanges, gas feed inlets and a single gas outlet. All process gases may be sourced from Praxair, Inc.

Despite that CVD is presented herein as an exemplary growth method, it is to be understood that CVD is just one of many processes that can produce templated carbons in the manner described. Other exemplary methods that could be used include, for example, coating a plate with an organic or polymeric precursor shell followed by pyrolyzing the precursor shell, or adhering oxidized graphitic nanoplatelets to solid- or liquid-state templates. In each case, the use of the template imparts a deterministic structure to the cellular carbon synthesized around it.

As mentioned above, CVD growth of the cellular carbon structures, as described herein, may be template-directed. Use of templates to form carbon powders of the various embodiments may create cellular carbons that differ in particle and cellular structure. Exemplary templates include MgO powder, as described in further detail below. However, it is to be understood that the instant disclosure is not limited to using such templates, nor to the other particular templates described herein. Other exemplary templates include, but are not limited to, oxides other than MgO (including mixed oxides such as silicates), carbonates, halides, sulfates, phosphates, polymers, droplets in emulsions, and bubbles. Some exemplary processes for growing cellular carbons, as well as additional template materials, have been described in greater detail in PCT/US17/17537.

Other differences in the morphology of the cellular carbons may result from varying certain process parameters, such as pre-CVD heating of templates. It is to be understood that variations of such parameters are within the scope of the instant disclosure, whether explicitly mentioned or not.

In a first embodiment, carbon powder sample may be synthesized using hydrated magnesium carbonate ($MgCO_3$) in the form of "nesquehonite" $MgCO_3$) rods as a template precursor. The nesquehonite may be "calcined," or heated to the point of decomposition, evolving $CO_2$ and $H_2O$ and resulting in an MgO template, prior to the CVD procedure used to create a powder according to the first embodiment. A propylene/argon mixture may be employed as the CVD feed gas.

Figure 1B:
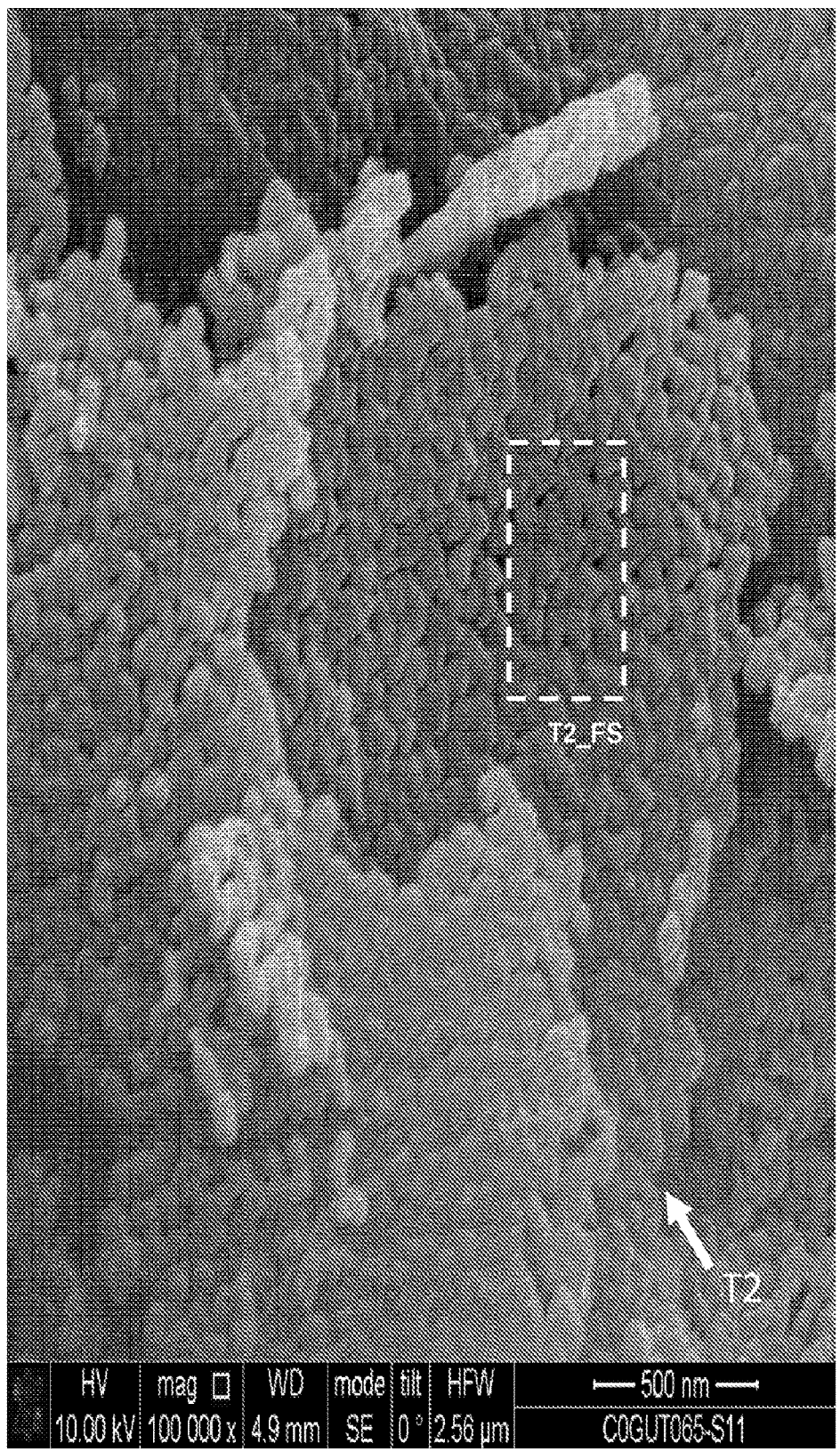
FIG. 1B is an SEM micrograph of an MgO template derived from calcining a nesquehonite powder.
Figure 1C:
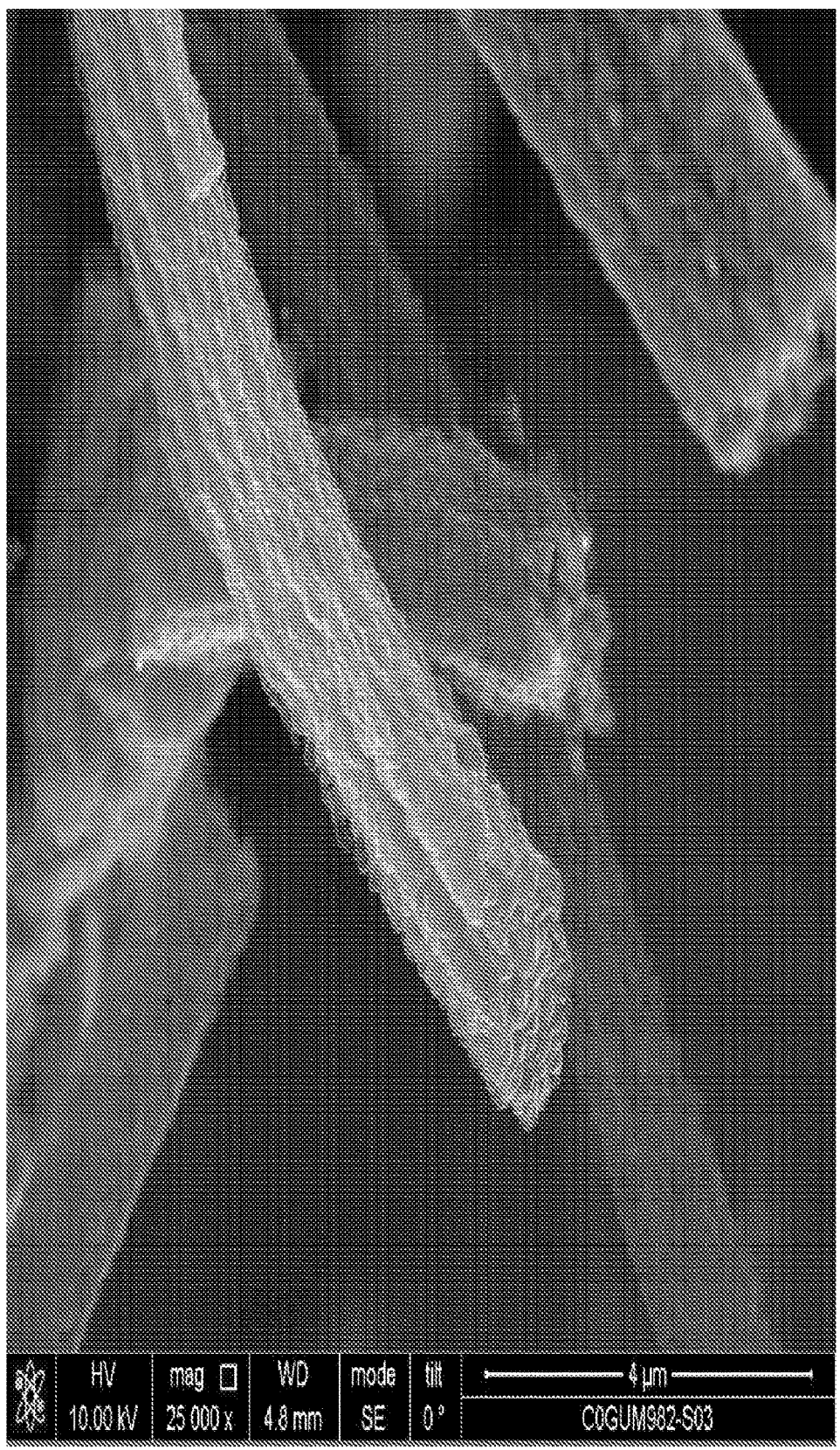
FIG. 1C is an SEM micrograph of a cellular carbon structure grown on a nesquehonite-derived MgO template.

FIGS. 1A-1B show the template structures during the various stages of this embodiment. FIG. 1A shows the structure of the nesquehonite template precursor T1. One can readily observe from FIG. 1A that nesquehonite particles t100 are rod-shaped and have a high "aspect ratio" (e.g., length to width) of substantially greater than 10:1. In some cases, the nesquehonite particle aspect ratio is greater than 50:1. FIG. 1B shows an MgO template T2 derived from calcining nesquehonite. In particular, FIG. 1B shows the fine structure T2_FS of the resultant MgO, which exhibits discretized features with the cubic MgO habit. Although not shown in FIG. 1B, the MgO template retains the rod-like, high-aspect ratio particle structure of the nesquehonite precursor shown in FIG. 1A. This fine structure and rod-like particle structure are imparted to the cellular carbon structure, as described in more detail below.

According to the first embodiment, the procedure to produce S1 may be as follows. N—$MgCO_3$ may be prepared via room temperature air sparging of a magnesium bicarbonate ($Mg(HMgCO_3)_2$) solution. The N—$MgCO_3$ may be filtered from the solution and evaporatively dried. The dried N—$MgCO_3$ may be subjected to ball milling followed by drying at 300° C. overnight before being used as the substrate for carbon production. 600 g of N—$MgCO_3$ may be loaded into a quartz tube (OD 100 mm) inside the furnace's heating zone. The tube may be rotated at a speed of 2.5 rpm during the ramp, growth and cool-down stages. The reactor may be ramped from morn temperature to a temperature setting of 750° C. over 30 minutes and maintained at that temperature for 30 minutes under 500 sccm Ar flow in order to produce the MgO template. Next, a 165 sccm $C_3H_6$ flow may be initiated while holding Ar flow unchanged. This may be continued for 30 minutes. The $C_3H_6$ flow may then be discontinued and the reactor may be allowed to cool to room temperature under continued Ar flow.

During the temperature ramp and hold the $MgCO_3$ may be converted to an MgO template/substrate for carbon growth. Subsequent to carbon growth, the MgO template may be extracted by acid-etching with hydrochloric acid (HCl), resulting in a slurry of carbon in an aqueous magnesium chloride ($MgCl_2$) brine. The carbon may then be filtered from the brine, rinsed with deionized water three times, and collected as an aqueous paste. A solvent exchange process may then be used to replace the water with acetone, which may result in an acetone/carbon paste. The paste may then be evaporatively dried to form a dry carbon powder (S1) according to the first embodiment.

The cells or cavities of the porous powder according to the first embodiment may be sealed with thin sheets of carbon via a secondary CVD process, wherein the cell wall is further grown via autocatalysis. More details regarding this procedure and the mechanisms involved are discussed in PCT/US17/17537. About 4.8 g of the dry carbon powder may be loaded into a quartz tube (e.g., a tube having an outer diameter (OD) of 60 mm) inside the furnace's heating zone. The quartz tube may then be rotated at a speed of 10 rpm during the temperature ramping described below, as well as the growth and cool-down stages. The CVD reactor may be ramped from room temperature to a temperature setting of 750° C. over 30 minutes. The rector temperature may then be maintained at 750° C. for 30 minutes under 500 scan Ar flow. Next, a 85 sccm $C_3H_6$ may be initiated while holding Ar flow steady at 500 sccm. This may be continued for 2 minutes. The $C_3H_6$ flow may then be discontinued and the reactor may be allowed to cool to room temperature under continued Ar flow. "S1" herein will refer to the carbon powder obtained after this secondary CVD process, according to the first embodiment.

In a second embodiment, the template used to form the carbon powder during CVD may be MgO particles made from Elastomag 170 "EL-170" MgO sourced from Akrochem, Inc. A propylene/argon mixture may be employed as the feed gas during CVD.

The procedure to produce an exemplary powder (S2) according to the second embodiment may be as follows. The as-received EL-170 may be calcined at 900° C. for 15 hours before use. A 500 g sample of EL-170 may be loaded into the quartz tube inside the furnace's heating zone. The tube may be rotated at a speed of 10 rpm during the ramp, growth and cool-down stages. The reactor may be ramped from room temperature to a temperature setting of 750° C. over 30 minutes and maintained at 750° C. for 30 minutes under 500 sccm Ar flow. Next, a 1050 sccm $C_3H_6$ flow may be initiated while holding Ar flow unchanged. This may be continued for 30 minutes. The $C_3H_6$ flow may then be discontinued and the reactor may be allowed to cool to room temperature under continued Ar flow.

The MgO may then be extracted by acid-etching with HCl, resulting in a slurry of carbon in an aqueous $MgCl_2$ brine. The carbon may then be filtered from the brine, rinsed with deionized water three times, and collected as an aqueous paste. A solvent exchange process may then be used to replace the water with acetone, resulting in an acetone/carbon paste. The paste may then be evaporatively dried to form a dry carbon powder.

The cells or cavities of the porous S2 powder may be sealed with thin sheets of carbon via a secondary CVD process, wherein the cell wall is further grown via autocatalysis. This procedure and the mechanisms involved have been discussed in PCT/US17/17537. For example, about 4.8 g of the dry carbon powder may be loaded into the quartz tube inside the furnace's heating zone. The tube may be rotated at a speed of 10 rpm during the ramp, growth and cool-down stages. The reactor may be ramped from room temperature to a temperature setting of 750° C. over 30 minutes and maintained at that temperature for 30 minutes under 500 sccm Ar flow. Next, an 85 sccm $C_3H_6$ flow may be initiated while holding Ar flow unchanged. This may be continued for 3 minutes. The $C_3H_6$ flow may then be discontinued and the reactor may be allowed to cool to room temperature under continued Ar flow. "S2" will refer herein to an exemplary carbon powder obtained after this secondary CVD process, according to the second embodiment.

In a third embodiment, the template used to form the carbon powder during CVD may be MgO particles made from EL-170, the same template feedstock used for the second embodiment. A propylene/argon mixture may be employed as the feed gas during CVD.

The procedure to produce a powder according to the third embodiment may be as follows. A 500 gram sample of El-170 may be loaded into the quartz tube inside the furnace's heating zone. The reactor may be ramped from room temperature to a temperature setting of 1050° C. over 30 minutes and maintained at that temperature for 30 minutes under 500 sccm Ar flow. The reactor may then be cooled to 750° C. in 30 minutes and allowed to equilibrate at 750 C for 30 minutes. At 750° C., a 250 sccm $C_3H_6$ flow may be initiated while holding Ar flow unchanged. This may be continued for 60 minutes. The $C_3H_6$ flow may then be discontinued and the reactor may be allowed to cool to room temperature under continued Ar flow.

The MgO may then be extracted by acid-etching with HCl, resulting in a slurry of carbon in an aqueous $MgCl_2$ brine. The carbon may then be filtered from the brine, rinsed with deionized water three times, and collected as an aqueous paste. A solvent exchange process may then be used to replace the water with acetone, resulting in an acetone/carbon paste. The paste may then be evaporatively. An exemplary carbon powder obtained according to this third embodiment will be referred to herein as "S3."

Comparison of S1, S2, and S3 Powder Structures

SEM micrographic analysis was performed on powder prepared according to the first, second, and third embodiment procedures in order to understand their nanostructure and microstructure.

FIG. 2A shows a powder sample (S1) fabricated according to the first embodiment. In FIG. 2A several individual particles, such as particle 100, appear to have a rod-like structure similar to the individual particles of the Nesquehonite template particles t100 shown in FIG. 1A. It appears, however, that the ball milling process used to generate S1 results in truncation of the relatively high aspect ratio (i.e., greater than 10:1) of the nesquehonite template precursor particles. A quick glance at FIG. 2A reveals that the average particle in S1 has an aspect ratio that is less than 10:1.

Figure 2C:
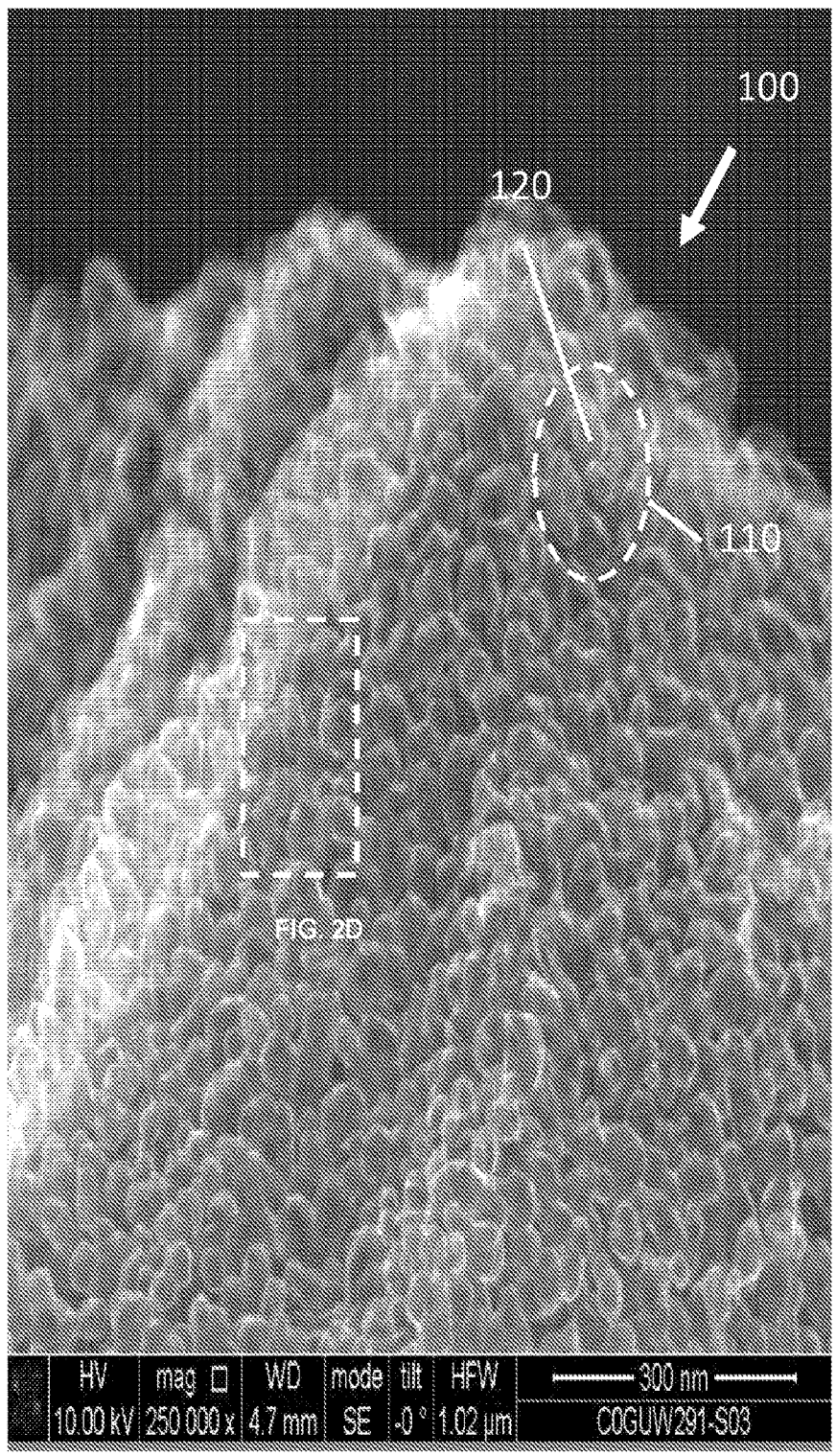
FIG. 2C is an SEM micrograph showing the cellular carbon particles of S1 carbon powder at higher magnification.

FIG. 2B is a magnification of particle 100 in FIG. 2A. FIG. 2B shows that the aspect ratio (a/b) of exemplary particle 100 is close to 3:1, reflecting the inherited microstructure of the nesquehonite-derived MgO template. However, it may be observed in FIG. 2C and FIG. 2D that the aspect ratio of the cavities formed by the fine structure (T2_FS of the nesquehonite-derived MgO, as shown in FIG. 1B) is less than the 3:1 ratio of exemplary particle 100. As indicated in FIG. 2C, the particles comprise multicellular clusters of individual cells 120. The individual cells 120 are smaller than 100 nm in diameter. In SEM, cells 120 appear in the SEM image as partially transparent. If the cells 120 include a portion of template or liquid filler, they would appear opaque. Therefore, the transparent appearance in FIG. 2C of the cells 120 indicates both that the MgO template that formed the cells has been removed and that they are unimpregnated by other solid or liquid.

The gas filling the cells 120 is typically the ambient gas present when the template is extracted. However, it is to be understood that the gas may be any suitable gas. For example, it may be desirable to fill the cells 120 with an inert gas to delay chemical reactions. It may be desirable to fill the cells 120 with gas at ambient pressure. However, it is possible to fill the cells 120 with gas at any suitable pressure. For example, it may be desirable to fill the cells 120 with gas at an elevated pressure with respect to the ambient pressure in the environment in which the carbon or composite including the cells 120 will be deployed. Doing so may impart a positive pressure on the inside walls of cells 120, potentially improving cell 120 rigidity and/or shape memory.

Figure 2D:
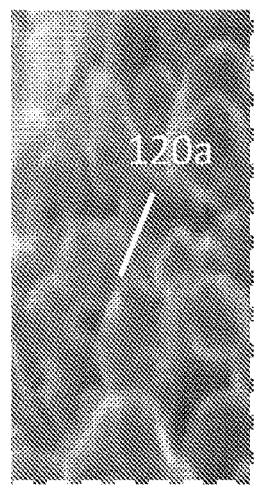

FIG. 2D is a magnification of the indicated portion of FIG. 2C showing cell walls 120a. As seen in FIG. 2D, cell walls 120a show up relatively clearly in SEM thanks to the high contrast image. FIGS. 2C/2D show that the cell walls 120a are only a few nanometers in thickness.

Figures 3A, 3B:
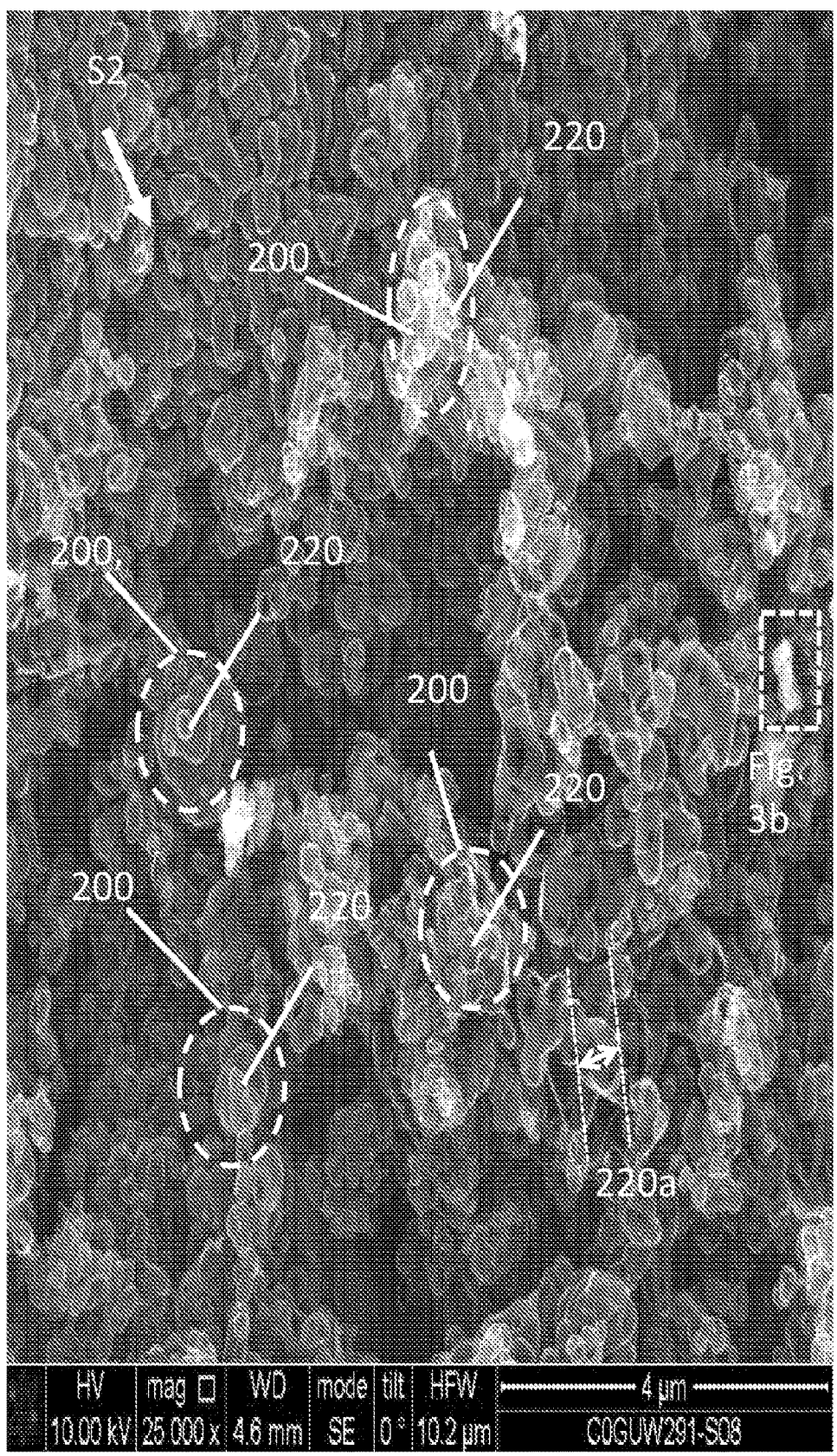
FIG. 3A is an SEM micrograph of the cellular carbon particles of S2 carbon powder.
FIG. 3B is a higher magnification of a portion of FIG. 3A showing unextracted MgO template materials trapped within a minor phase of cellular carbon particles. These impregnated cells appear less transparent.

FIG. 3A shows particles 200 of a powder (S2) prepared according to the second embodiment. A comparison of FIG. 3A with FIG. 2A shows that the cells 220 of S2 are more discrete and less interconnected than the cells 120 of S1. FIG. 3A also shows that cells 220 in this powder are larger than 200 nm in diameter (see, e.g., 220a, the diameter of an exemplary cell which is approximately 400 nm).

FIG. 3B is a magnification of the indicated portion of FIG. 3A showing a minor phase of cellular carbon particles impregnated with residual MgO template material as a result of imperfect or incomplete acid extraction of the template. The impregnated cellular carbon particles appear opaque compared to the unimpregnated cells due to the presence of the template.

Figure 4:
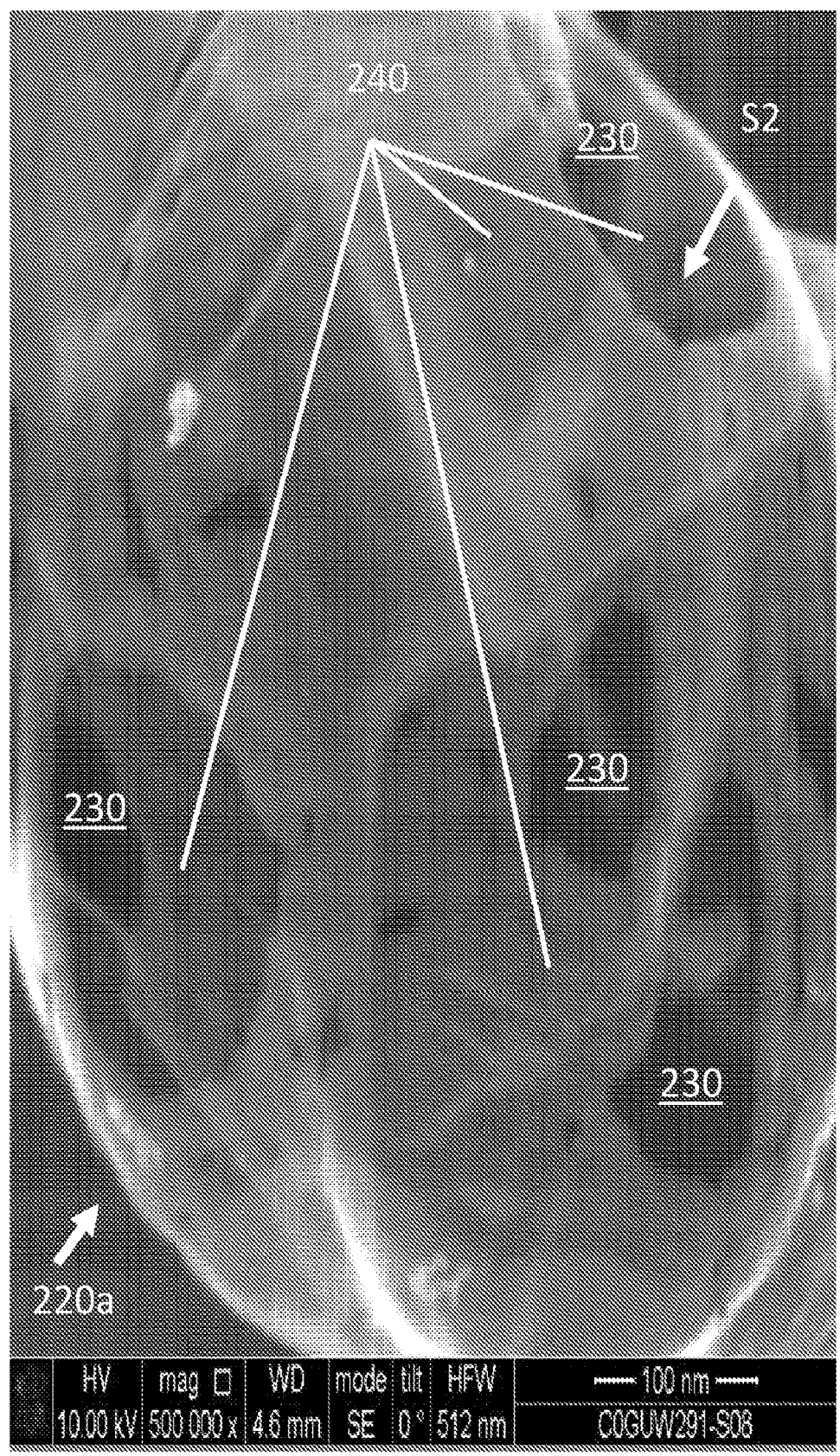
FIG. 4 is an SEM micrograph of an individual carbon cell in which transverse pores through the cell walls have been covered by nearly-transparent carbon sheets.

FIG. 4 shows an individual cell 220a of S2 powder in which transverse pores 230 through the cell walls have been covered by nearly-transparent carbon sheets 240. The carbon sheets 240 are grown during the secondary CVD process step described above. The sheets 240 form "patches" overlaying the transverse pores 230 that may reduce the permeability of the cells 220a when the cells 220a come into contact with liquid polymers or resin. In this way, the secondary CVD process has the potential to seal holes in the cell walls created by MgO (or other) template extraction.

Figure 5:
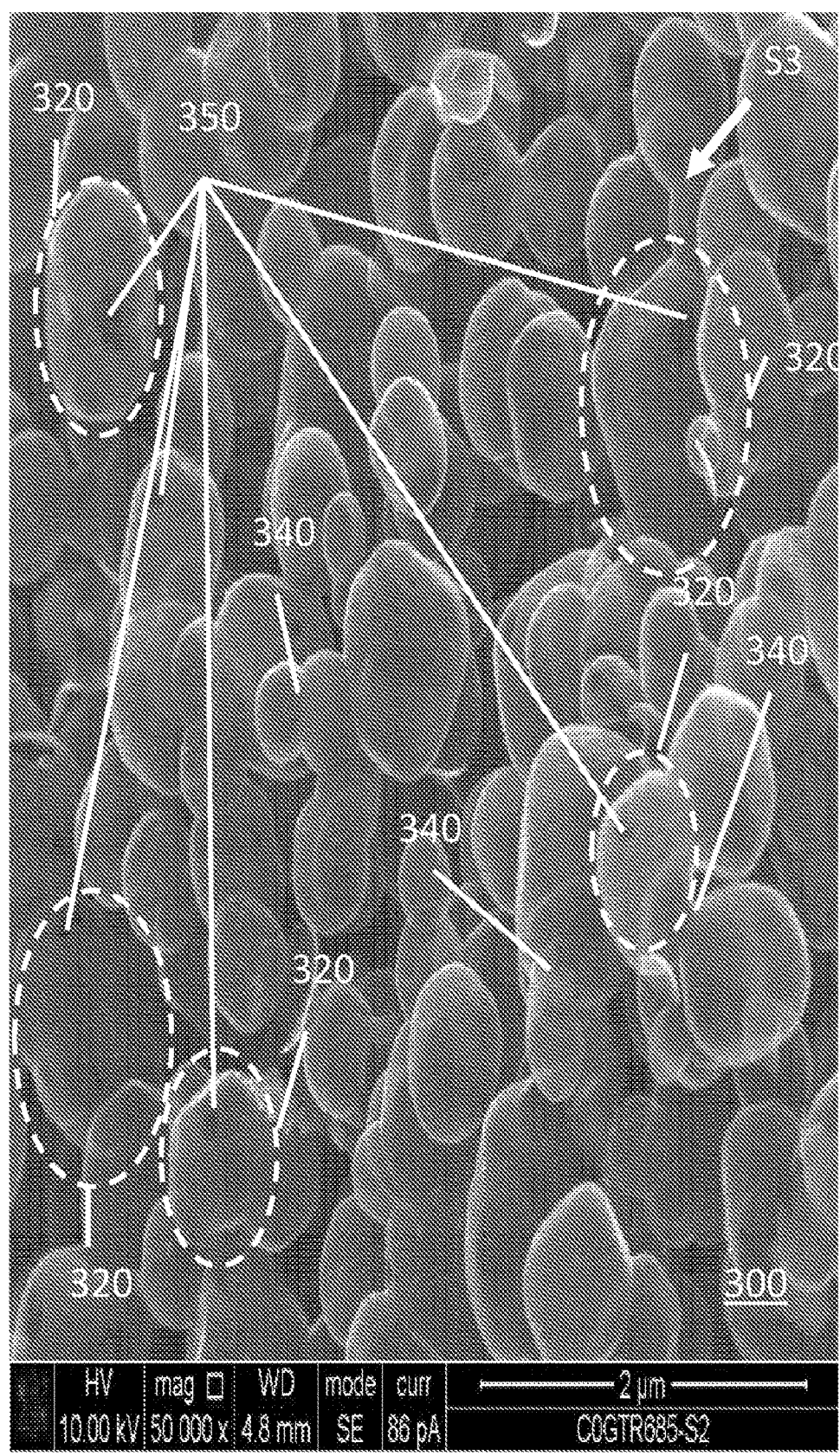
FIG. 5 is an SEM micrograph of the cellular carbon particles of S3 carbon powder.

FIG. 5 shows a particle 300 of a powder (S3) prepared according to the third embodiment. Unlike particles prepared according to the first and second embodiments (S1 and S2, shown in FIGS. 2A and 3, respectively), the particles prepared according to the third embodiment (S3) are generally spheroidal. This morphological difference is not due to the template feedstocks, since S2 and S3 were grown on EL170. Instead, the difference in morphology is due to the different temperatures of the pre-CVD heating treatment (1050° C. for S3 vs 750° C. for S2). Higher temperature, in the case of S3, results in more sintering, and smoother/larger particles. As shown in FIG. 5, most cells 320 in S3 are connected to one or more neighboring cells 320 via "bridges" 340, or connecting pieces of carbon. FIG. 5 also shows that the walls of cells 320 possess unpatched holes 350 (in contrast to the patched pores shown in FIG. 4), since no secondary CVD process was applied to patch the holes. However, it is understood that such a process could be applied to, among other things, seal the holes 350 in cells 320.

Carbon/Polymer Composite Preparation

In a fourth embodiment, Carbon/polymer composites may be created by combining one or more of powders S1 and S2 with an exemplary polymer "binder" Polyolefin 164-1 (100% solids) or "CPO." Two composite powder samples C1 and C2 may be made from powders produced according to the first and second embodiments (e.g., S1 and S2), respectively. It is to be understood that other powder combinations are within the scope of this disclosure.

As used herein, the term "binder" will generally refer to an additive used to create a composite material with the carbon powders (e.g., S1-S3). A "binder" may chemically bind to the carbon powders. Alternatively, the "binder" may not bond chemically to the carbon. The binder may, for example, simply provide structural support to the resulting composite. Although CPO is provided as an exemplary binder, it is to be understood that any binder suitable for providing sought-after properties of the composite could be used. Other exemplary binders include other suitable polymeric materials. Binders may also include metallic materials, ceramics, or other carbon materials. Ceramic binders could be generated via functionalization of the carbon with metal oxides, followed by sintering, or via pyrolyzing an inorganic polymer precursor such as polysiloxane. Examples of other carbon materials that could be used as a binder include, but are not limited to, pyrolytic carbon materials generated via thermal decomposition of polymeric precursors. Still other binders may include thermoplastics, such as poly(methyl methacrylate), acrylonitrile butadiene styrene, polyamide, polylactic acid, polybenzimidazole, polycarbonate, polyether sulfone, polyoxymethylene, polyether ether ketone, polyetherimide, polyethylene, polyphenylene oxide, polphenylene sulfide, polypropylene, polystyrene, polyvinyl chloride, polytetrafluoroethylene, or copolymers thereof. Binders may also include thermosetting polymers, such as polyester, polyurethane, polyurea, phenol-formaldehyde, urea-formaldehyde, epoxy, benzoxazine, polyimide, bismaleimide, polycyanurate, polysiloxane, vinyl ester, or blends thereof.

The CPO binder may be obtained from Eastman Chemical Company and have a chlorine content between 17.5% and 23%. One control sample (C0) was made from the CPO binder alone without cellular carbons.

To make composite powders according to this embodiment (e.g., C1 and C2), two solutions of CPO in toluene may first be made. Each solution may be made by dissolving 2.4 grams of CPO powder into 40 grams of toluene. Each solution may be magnetically stirred for 30 minutes. Then 1.6 grams of carbon S1 may be added to one of the solutions used to make C1, and 1.6 grams of carbon S2 may be added to the other solution used to make C2. Each solution may be magnetically stirred for 10 minutes in order to wet the carbon surfaces. Subsequently, each CPO/toluene solution may be subjected to 30 minutes of bath sonication using a Branson 8510DTH to disperse the carbon throughout.

Next, the CPO in each solution may be coated onto the surface of the dispersed carbon particles. To accomplish this, each solution may be subjected to a destabilization treatment to remove the CPO from the solution phase. This destabilization may be accomplished by adding 120 grams of isopropyl alcohol (IPA) in a dropwise fashion into each of the solutions. The IPA may be added at a rate of about 15 g/min, while stirring, to facilitate the complete removal of the CPO from solution. CPO-coated carbon particles may then be filtered from each solution and rinsed with IPA. Each of the resulting CPO-carbon retentates may be dried at ~80° C. overnight, then ground with a mortar and pestle, resulting in two samples of fine composite powder, C1 and C2, corresponding to cellular carbons S1 and S2, respectively.

The two exemplary composite powder samples, C1 and C2, accoding to this embodiment were produced in the above-described manner. A control powder sample C0 of CPO binder alone was also produced.

Composites according to this embodiment may be mold compressed as follows. Samples may be loaded into a cylindrical compression mold designed to be compressible by tightening screws. Once loaded with powder, the mold may be placed into an oven pre-heated to 150° C. The mold may then be kept in the oven for 20 minutes, allowing the CPO to soften. Subsequently, the mold may be removed from the oven and the sample may be compressed by tightening the screws on the mold with a torque wrench. The compressed mold may then be placed back in the oven at 150° C. for another 20 minutes, after which it may be removed once more and allowed to cool to room temperature. The sample specimens may then be ejected from the mold at room temperature, and the flat surfaces of the sample specimens may be polished in order to provide a uniform surface for compression testing.

Each sample C0, C1, and C2 was produced in the above-described manner and then tested for compressive strength and compressive modulus. The tests were performed according to the ISO 844 standard using cylindrical specimens. The crosshead speed of the tester was 1.0 mm per minute.

Comparison of Compression-Molded Specimens

Sample specimen dimensions were assessed using a Mitutoyo digital caliper as follows. Four separate diameter measurements (D1-D4) and three separate height measurements (H1-H3) were obtained, along with specimen weights.

Table 1 compiles the results. As shown in Table 1, the diameters and heights of the specimens ranged from 12.0-13.0 mm and 14.0-18.0 mm, respectively.

TABLE 1

| Sample | Mass (g) | D1 (mm) | D2 (mm) | D3 (mm) | D4 (mm) | H1 (mm) | H2 (mm) | H3 (mm) |
|---|---|---|---|---|---|---|---|---|
| C0 | 1.584 | 12.96 | 12.73 | 12.86 | 12.95 | 12.79 | 12.76 | 12.78 |
| C1 | 1.145 | 12.46 | 12.48 | 12.32 | 12.30 | 12.29 | 12.23 | 12.29 |
| C2 | 0.802 | 12.83 | 12.87 | 12.96 | 13.01 | 13.38 | 13.37 | 13.41 |

Specimen density was then determined by using the above-measured dimensions in conjunction with weight measurements. Table 2 reports the average dimensions, and the accompanying volume and density of the specimens.

TABLE 2

| Sample | Avg diameter (mm) | Avg height (mm) | Volume (cm$^3$) | Carbon Percentage | CPO Percentage | Density (g/cm$^3$) |
|---|---|---|---|---|---|---|
| C0 | 12.88 | 12.78 | 1.663 | 0% | 100% | 0.952 |
| C1 | 12.39 | 12.27 | 1.479 | 40% | 60% | 0.774 |
| C2 | 12.92 | 13.39 | 1.754 | 40% | 60% | 0.457 |

Table 2 shows that C1 and C2, the carbon-containing composites, were significantly less dense than C0, the polymer control. Solid carbon is denser than the CPO. Therefore, these results are likely explained by the high degree of porosity in the C1 and C2 samples. Note that C2 density was extremely low, less than 50% of the density of C0 and only slightly more than 50% of the density of C1. This implies that the degree of porosity in C2 is relatively high.

The structure of the C1 composite powder and C1 molded specimen was assessed using SEM in order to see the result of the CPO coating procedure on the carbon particles.

Figure 6:
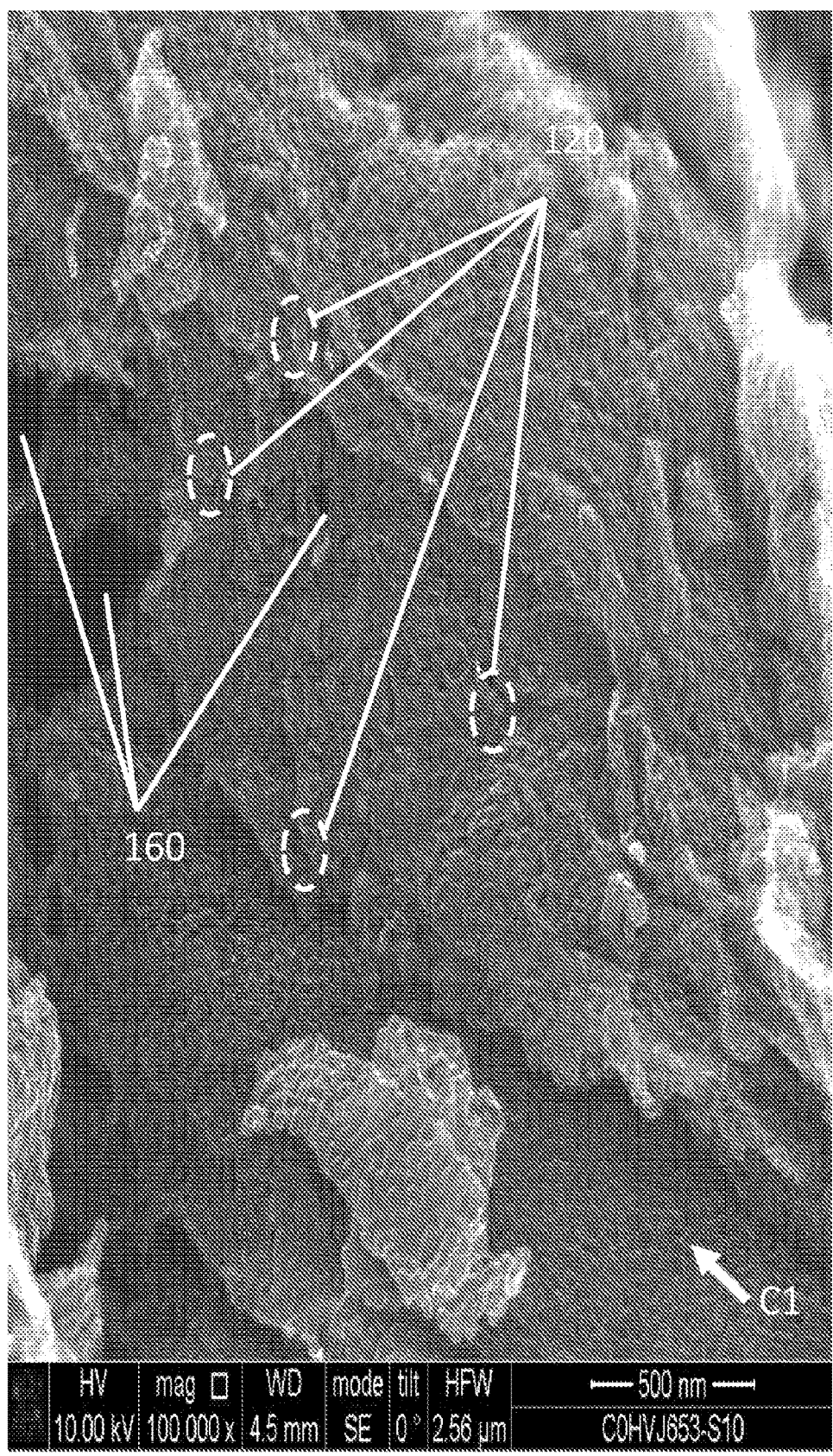
FIG. 6 is an SEM micrograph of C1 composite powder prior to densification.

FIG. 6 is an SEM micrograph of the C1 composite powder prior to densification in the mold. Several features of S1 powder are visible in FIG. 6, including cells 120 of S1, as well as intercellular pores 160. FIG. 6 shows that the CPO is virtually indistinguishable from the carbon (S1) in the SEM image. No obvious phases of CPO could be observed throughout the sample. This implies that the CPO polymer wetted the carbon evenly.

Figure 7:
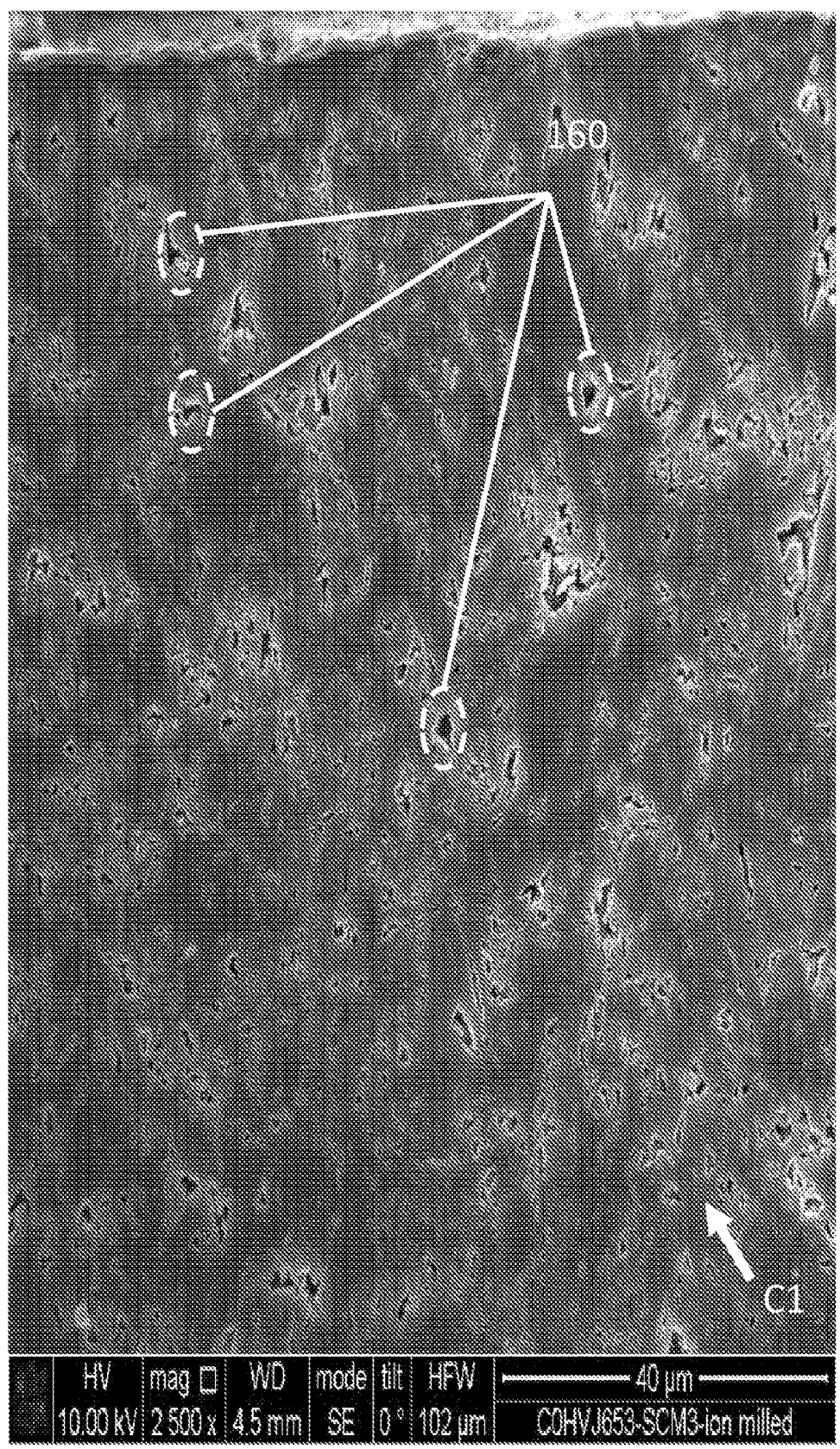
FIG. 7 is an SEM micrograph of a cryo-ion beam milled cross-section of a compression-molded C1 sample specimen. Large, irregular micron-scale pores are distributed throughout the composite.

FIG. 7 is an SEM micrograph that shows the structure of C1 after densification in the compression mold and subsequent heating causes the CPO to fuse the carbon cells together into a cylindrical composite specimen. More specifically, FIG. 7 shows a cryo-ion milled cross-section of such a specimen.

As shown in FIG. 7, large, irregular intercellular micron-scale pores 160 shown in FIG. 6 remain distributed throughout the molded C1 composite specimen after densification, reflecting incomplete densification. Pores 160 have shapes that appear to be independent of the size and morphology of the carbon cells 120 in C1/S1. Rather, pores 160 appear large enough to be intercellular, although FIG. 7 does not clearly show individual cells 120. This intercellular porosity may result from a limited packing efficiency of the carbon nanostructure represented by C1, insufficient densification due to insufficient compression, lack of sufficient amounts of free-flowing CPO to fill these spaces, and/or potentially cavitation at the CPO/S1 (carbon) interface resulting from the removal of the cooled C1 composite specimens from the mold.

Figure 8:
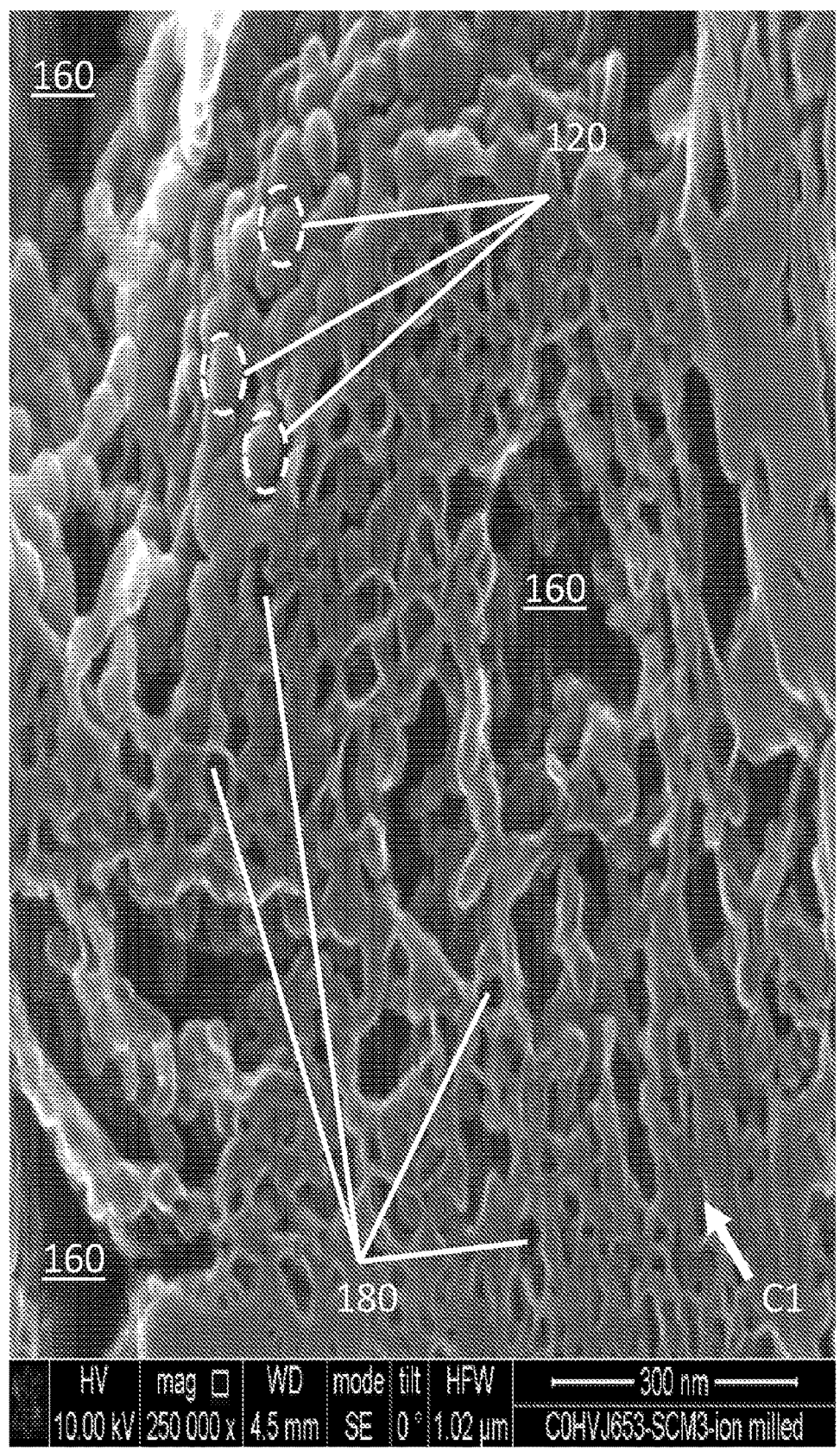
FIG. 8 is an SEM micrograph of the cryo-ion beam milled cross-section of the compression-molded C1 sample specimen. Intracellular or endohedral porosity corresponding to the S1 cell cavities can be observed, as well as larger intercellular voids.

FIG. 8 is a higher magnification SEM micrograph of the cryo-ion milled cross-section of the C1 pellet in FIG. 7. At the level of magnification shown in FIG. 8, a second mode of pores 180 of intracellular or endohedral porosity can be observed in addition to the intercellular pores 160 shown in FIG. 7. The second mode of pores 180, which have diameters of 50 nm or smaller, are found throughout the cross-section. Close examination of FIG. 8 reveals that the second mode of pores 180 appear to correspond to the cavities of cells in the S1 structure (see, e.g., cells 120 in FIGS. 2C and 8).

Figure 9A:
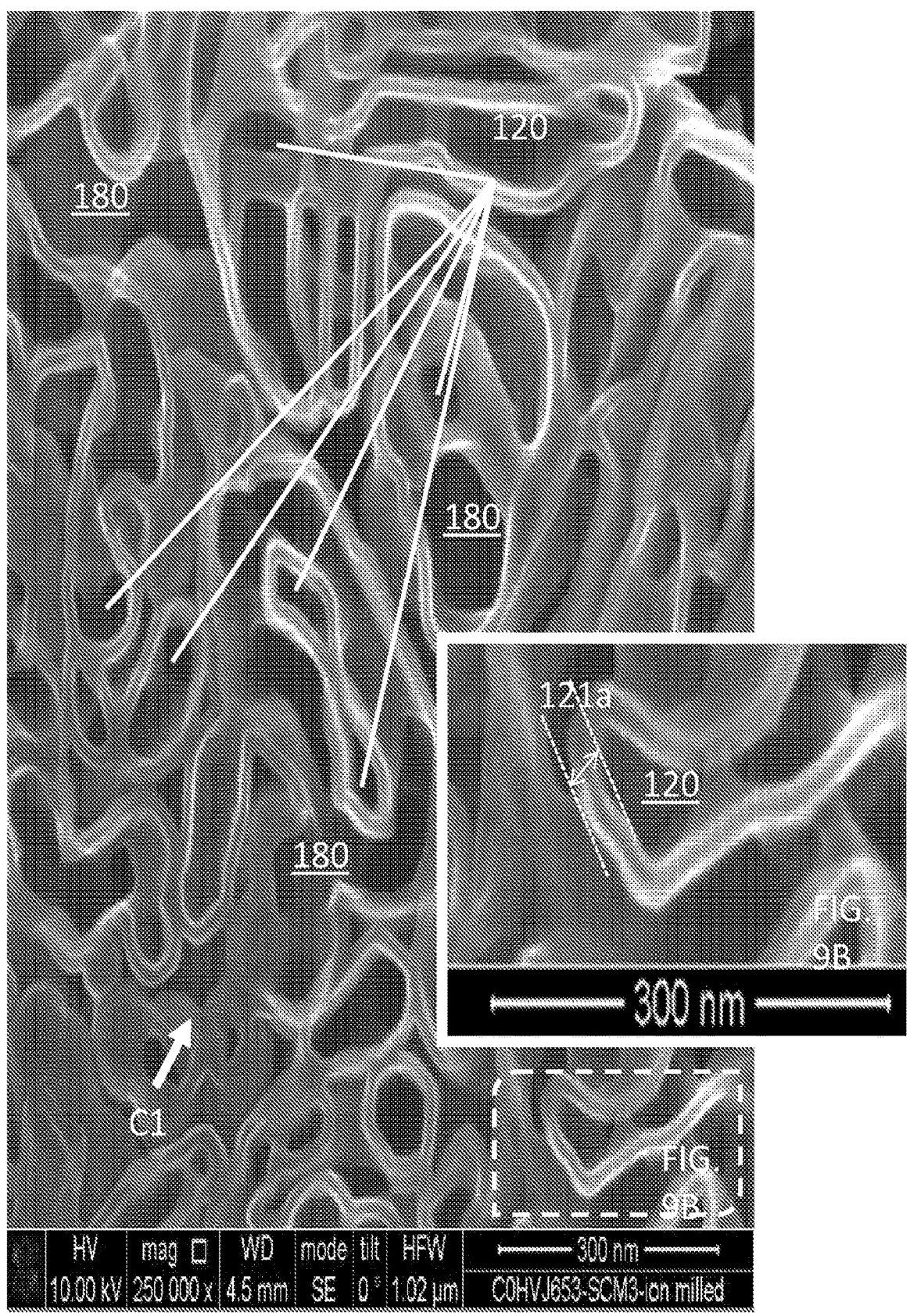
FIG. 9A is an SEM micrograph of the cryo-ion beam milled cross-section of the compression-molded C1 sample specimen. A cluster of quasi-networked cells can be observed.

FIG. 9A is another cross-sectional SEM image of C1. FIG. 9A shows a cluster of cells 120. In the cluster, what appear to be gas-filled carbon cells (otherwise referred to herein as "endohedral voids") 120 and intercellular voids 180 are both present. Both modes of porosity lower the density of the composite, explaining the result that the density of C1 samples is lower than C0 (Table 2).

FIG. 9B is an inset, magnified portion of FIG. 9A showing an individual cell 120. As shown in FIG. 9B, the cell wall and adsorbed layer of CPO 121a appears approximately 30 nm thick, which is far thicker than the cell wall 121 alone. The average thickness of the cell walls 121 in a nanostructured carbon may vary from a few nm up to 100 nm.

Figure 10:
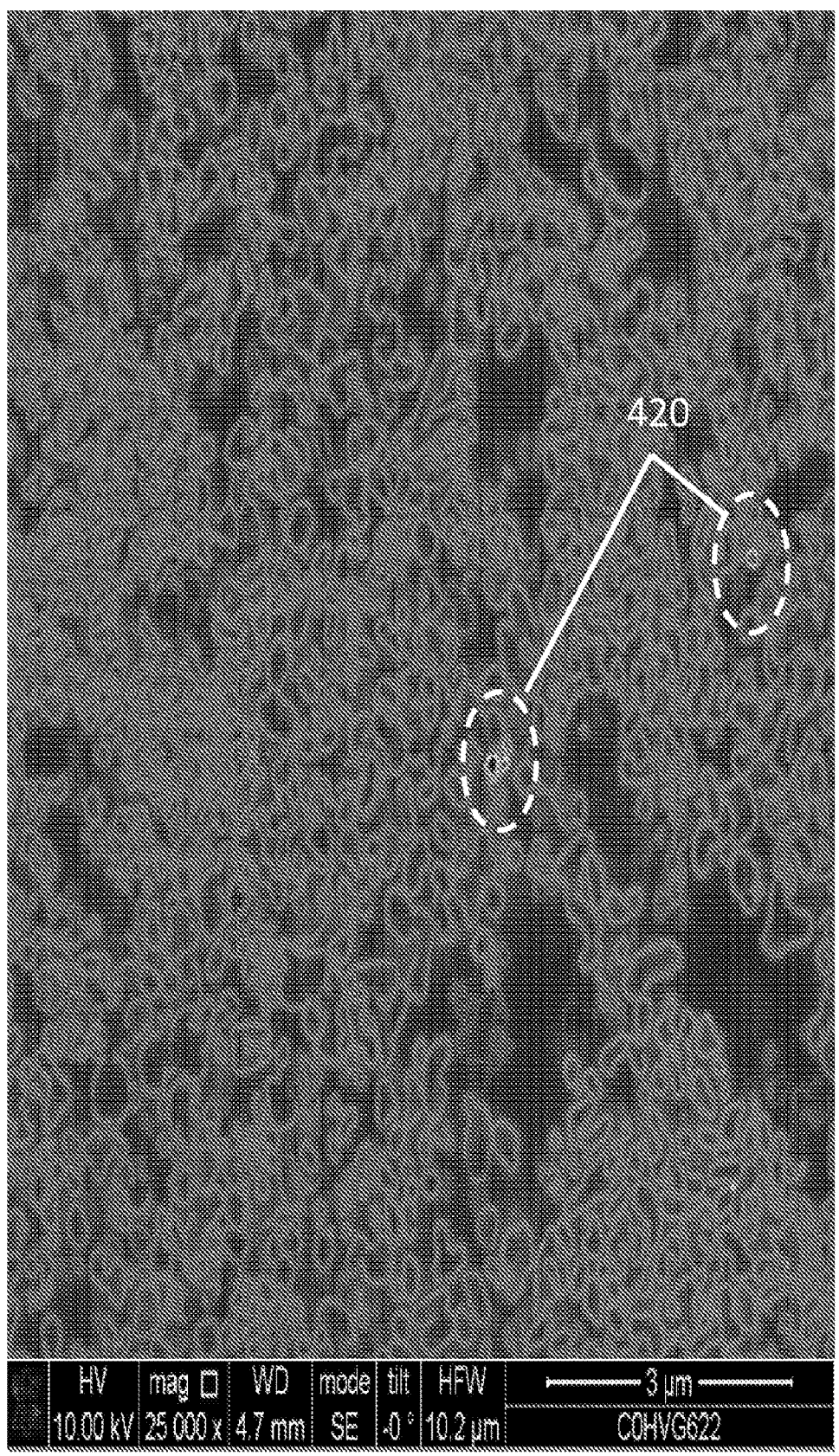
FIG. 10 is an SEM micrograph of a cryo-ion beam milled cross-section of a compression-molded composite comprised of 10% cellular carbon and 90% CPO by weight. This image demonstrates the contrasting visual appearance of impregnated cells and unimpregnated cells.

For the sake of comparison, FIG. 10 is an SEM image of a cryo-ion milled cross-section of a compression-molded composite with a higher CPO content than either C1 or C2 composites. The composite shown in FIG. 10 is 90% CPO, by weight, and 10% cellular carbon. The compressive force during molding, combined with the porous cell walls and the higher CPO content of the composite in FIG. 10, facilitates the polymer's impregnation of the cells and intercellular spaces. In fact, only a few unimpregnated cells 420 are visible in the image. Like the unimpregnated cells 120 in FIGS. 8-9, the unimpregnated cells 420 in FIG. 10 can be identified by the relative darkness of the unimpregnated cell cavities as well as a lighter, charging effect of the cell walls surrounding the cavities. The unimpregnated cells 420 appear in stark visual contrast to the surrounding impregnated cells.

Conductivity Testing

The electrical sheet resistance of C0, C1, and C2 was measured with a Keithly 2400 SourceMeter 4 point probe. The measurement confirmed C0 as an insulator (no reading). C1 had an average sheet resistance of 1.58 Ω/sq and a minimum sheet resistance of 1.46 Ω/sq. C2 had an average sheet resistance of 2.51 Ω/sq and a minimum sheet resistance of 2.46 Ω/sq. Each reported sheet resistance is the average of three separate measurements.

These results show that the sheet resistance of each of the samples is relatively low when compared to typical insulative polymeric materials, such as C0. This implies that the carbon forms a conductive network throughout the composite, despite being coated by polymer. This suggests that composite materials reinforced with cellular carbons, such as S1-S3, may be desirable for applications requiring lightweight, conductive materials. Such applications may include "smart" composite materials including the capability of piezoresistive sensing.

Mechanical Testing

The mechanical properties of C1 and C2 specimens were tested on a hydraulic universal testing system with a compression subpress fixture supplied by Wyoming Test Fixtures and a 3000 lb (13345N) load cell. The testing system was operated at a constant crosshead speed of 1 mm per minute. Data was recorded in real time using a National Instruments USB-6341 data acquisition system connected to a Windows PC. Strain data was measured using a deflectometer (Model 3540) supplied by Epsilon Technology Corporation.

Table 3 shows measured compressive strength for C0, C1, and C2. Compressive strength was measured at 10% strain for samples that did not reach their ultimate compressive strength during the measurement. Otherwise, the compressive strength given in Table 3 is the ultimate compressive strength. Table 3 also shows the compressive modulus for samples C0 through C2.

TABLE 3

| Sample | Compressive Strength at 10% strain or Ultimate Compressive Strength | | | Compressive Modulus | |
|---|---|---|---|---|---|
| | Stress (MPa) | Strain (%) | Improvement | Modulus (MPa) | Improvement |
| C0 | 6.94 | 10.0 | 0% | 107.9 | 0% |
| C1 | 50.42 | 8.47 | 627% | 800.1 | 642% |
| C2 | 16.87 | 10.0 | 143% | 299.4 | 177% |

Both the compressive strength and modulus of the porous composite materials, C1 and C2, are much higher than the C0 sample, which is CPO polymer without any carbon added. This result shows that adding carbon materials to CPO strengthens and stiffens the composite.

TABLE 4

| Sample | Specific Compressive Strength at 10% strain or Specific Ultimate Compressive Strength | | Specific Compressive Modulus | |
|---|---|---|---|---|
| | Specific Strength (MPa/g/cm$^3$) | Improvement | Specific Modulus (MPa/g/cm$^3$) | Improvement |
| C0 | 7.29 | 0% | 113.3 | 0% |
| C1 | 65.14 | 794% | 1034 | 812% |
| C2 | 36.91 | 406% | 655.1 | 478% |

As shown in Table 4, which gives the specific strength and modulus of C0, C1, and C2, the effect of adding carbon on the composite's mechanical properties are even more dramatic. The table shows that adding S1 to CPO in composite C1 improves specific strength and specific modulus by around 800%.

The improvements in mechanical properties are likely due to the distribution of load in the composite. For example, the strength improvements may result from improving stress transfer from the polymer to the cellular carbon reinforcing phase. The modulus improvements suggest that the C1 composite effectively distributes the compressive load around both the endohedral and intercellular voids. Voids in non-rigid polymers like CPO tend to yield before the matrix, resulting in significant compaction (e.g., increasing the compressive strain without significantly increasing stress) and a correspondingly low compressive modulus.

C1 and C2 composite specimens also exhibited improved shape retention upon compression testing when compared to comparable composite materials. Specifically, when the compressive force applied by the test frame was released, the C1 and C2 specimens relaxed back to dimensions within a few percent of their pre-testing dimensions shown in Table Strain tests also revealed similar results. In the strain tests, a C1 sample was compressed multiple times at increasing amounts of stress and strain. Sample dimensions were measured after each individual compression test. The measured dimensions were then used to calculate stress and strain in the next iteration.

The results, reported in Table 5, were as follows. The average of four diameter and height measurements made via calipers was determined prior to each test. Based on the average diameter and height, and based on a specimen mass of 0.687 grains (unchanged throughout all 7 tests), the densification of the specimen was tracked along with the force applied, strain obtained, and compressive stress.

TABLE 5

| Test # | Average diameter (mm) | Average height (mm) | Density (g/cm$^3$) | Force Applied (N) | Strain (%) | Stress (MPa) |
|---|---|---|---|---|---|---|
| 1 | 13.09 | 14.89 | 0.343 | 1103 | 3.84% | 8.19 |
| 2 | 13.03 | 14.86 | 0.347 | 1188 | 4.37% | 8.92 |
| 3 | 13.05 | 14.79 | 0.348 | 1549 | 9.27% | 11.59 |
| 4 | 13.02 | 14.71 | 0.351 | 1572 | 9.56% | 11.81 |
| 5 | 13.09 | 14.66 | 0.349 | 2115 | 20.32% | 15.72 |
| 6 | 13.09 | 14.50 | 0.352 | 2132 | 20.64% | 15.84 |
| 7 | 13.19 | 14.42 | 0.349 | 3481 | 39.39% | 24.46 |
| 8 | 13.32 | 14.16 | 0.348 | — | — | — |

The relatively low values of strain shown in Table 5 suggest that the composite materials have a certain amount of "shape memory," particularly when the applied force is relatively low (i.e., when the applied force is below 1600 N, the shape is retained to within 10%). This sets composite C1 apart from typical rigid foams, such as syntactic foams or CPO by itself, which normally exhibit very little elasticity.

Table 6 shows how the composite C1 retains this "shape memory" even at relatively high strains.

TABLE 6

| Test # | Strain (%) | Sample Deflection (mm) | Rebound (mm) | Permanent Height Deformation (mm) | Permanent Height Deformation (%) |
|---|---|---|---|---|---|
| 1 | 3.84% | 0.57 | 0.54 | 0.03 | 0.18% |
| 2 | 4.37% | 0.65 | 0.55 | 0.10 | 0.67% |
| 3 | 9.27% | 1.37 | 1.20 | 0.17 | 1.17% |
| 4 | 9.56% | 1.41 | 1.18 | 0.23 | 1.54% |
| 5 | 20.32% | 2.98 | 2.60 | 0.37 | 2.58% |
| 6 | 20.64% | 2.99 | 2.54 | 0.45 | 3.15% |
| 7 | 39.39% | 5.68 | 4.99 | 0.69 | 4.90% |

In particular, Table 6 shows that the specimen recovered up to slightly more than 95 of its original height (height deformation of less than 5%) even when subjected to a strain of nearly 40 This extraordinary shape retention is likely attributable to the ability of the carbon cells to deform under high stress, then return to their original dimensions.

The cellular carbons described herein may be particularly effective at recovering their shape after deformation due to their defect-engineered carbon lattice structures. As described in PCT/US17/17537 such as those used in the present disclosure may cause the formation of lattice defects throughout the cell walls. Theoretical models have predicted that topologically defective lattices would be more ductile than crystalline graphene. Another possibility is that $sp^3$-hybridized bonds may have been formed between the lattices comprising the cell walls, preventing the lattices from shearing over one another. Interlayer shear is a likely mechanism or the wall to stress-relax during compression.

Figure 11:
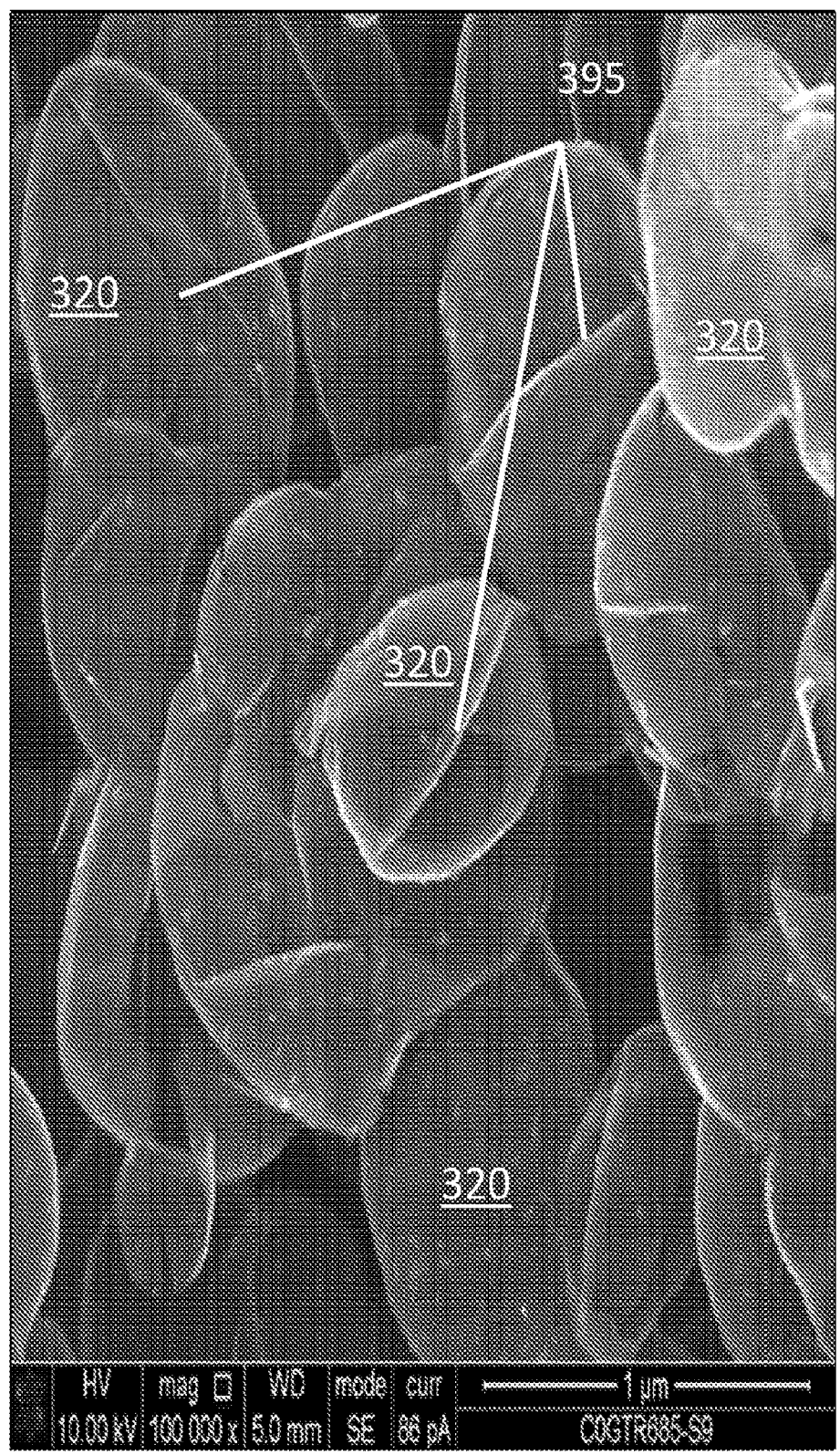
FIG. 11 is an SEM micrograph of cellular carbons after being subjected to 250,000 psi of uniaxial compression. Linear buckling patterns are evident.

FIG. 11 shows the results of uniaxial compression testing on cellular carbon sample S3 at a pressure of approximately 250,000 psi. The effects of compressing the cells 320 can be seen in the linear buckling 395. The linear buckles 395 reflect yielding due to stress concentration during compressive deformation of the cells 320. Despite the cell wall buckling, the cells 320 have apparently recovered their generally spherical shape after being flattened. This indicates their ability to store and release elastic potential energy, which again suggests that the cell walls are prevented from stress-relaxing via interlayer shear.

Figure 12:
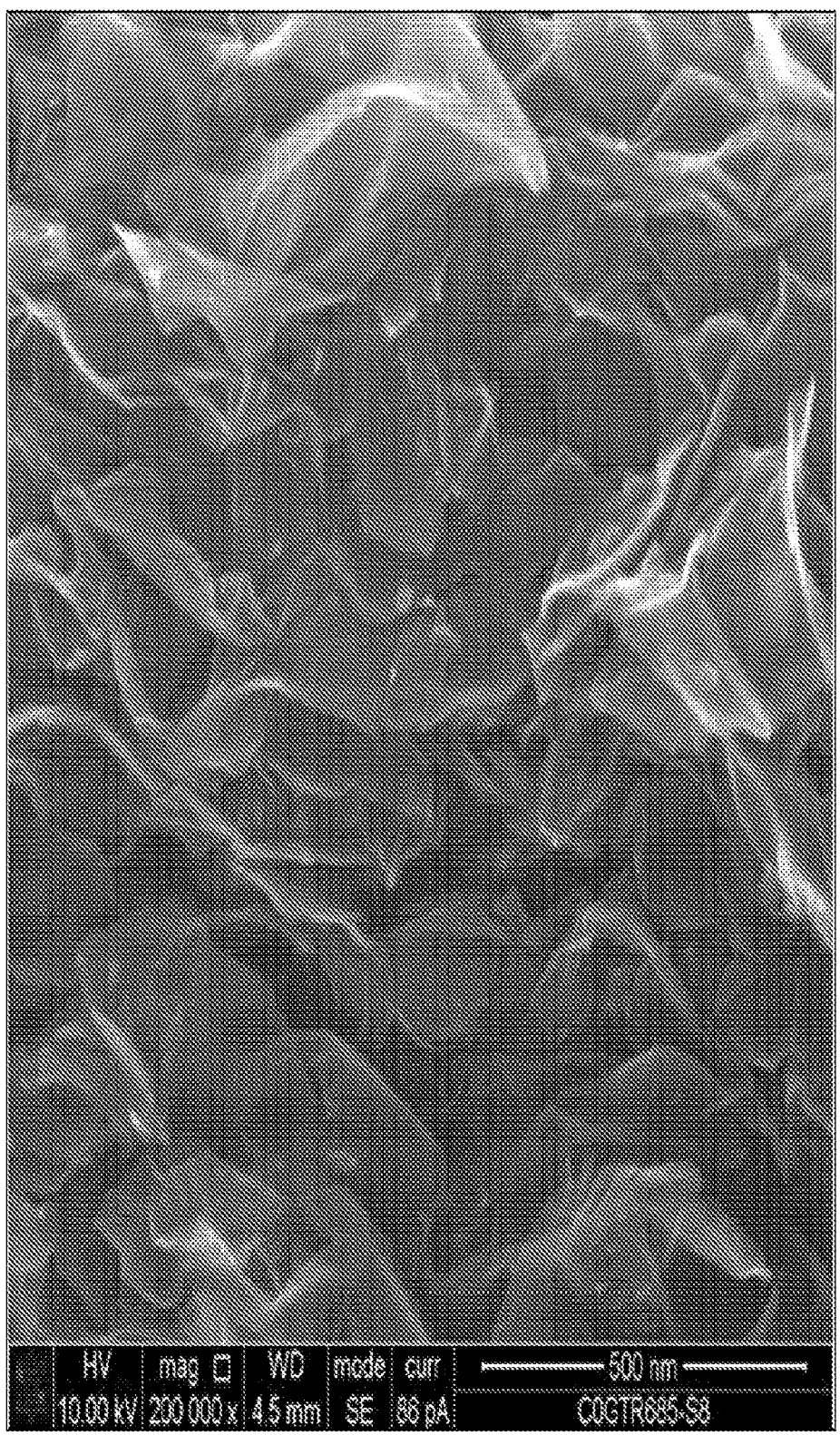
FIG. 12 is an SEM micrograph of collapsed spheroidal cellular carbons with crystalline lattices.

Crystalline cellular carbons, by contrast, exhibit irreversible crushing after 250,000 psi compression. Unlike defect-engineered cellular carbon powders such as S1-S3, which were not pelletized by compression of the powder up to 250,000 psi, crystalline cellular carbon powders were readily pelletized by compression of the powder and formed a dense pellet. FIG. 12 is an SEM micrograph of a $sp^2$-hybridized crystalline cellular carbon after being subjected to 250,000 psi of uniaxial compression. Specifically, the image shows collapsed spheroidal cellular carbons, that were subjected to the same compression process as the cellular carbons shown in FIG. 11. The carbons in FIG. 12 were grown by a higher temperature CVD growth process (1050° C.), whereas the cells 320 shown in FIG. 11 were grown by a lower temperature CVD growth process (750° C.). The carbons in FIG. 12 were crushed irreversibly, likely flattening as the lattices comprising the cell walls sheared over one another. As a result, the cells did not regain their shape or porosity after the compressive force was removed. The cells also exhibit more wrinkles and folds than the cells 320 in FIG. 12 that were subjected to the same uniaxial compression. The wrinkles may result from the topological mismatch between the planar graphitic cell walls and the curved template surfaces.

Composite Materials as Coating

Figure 13:
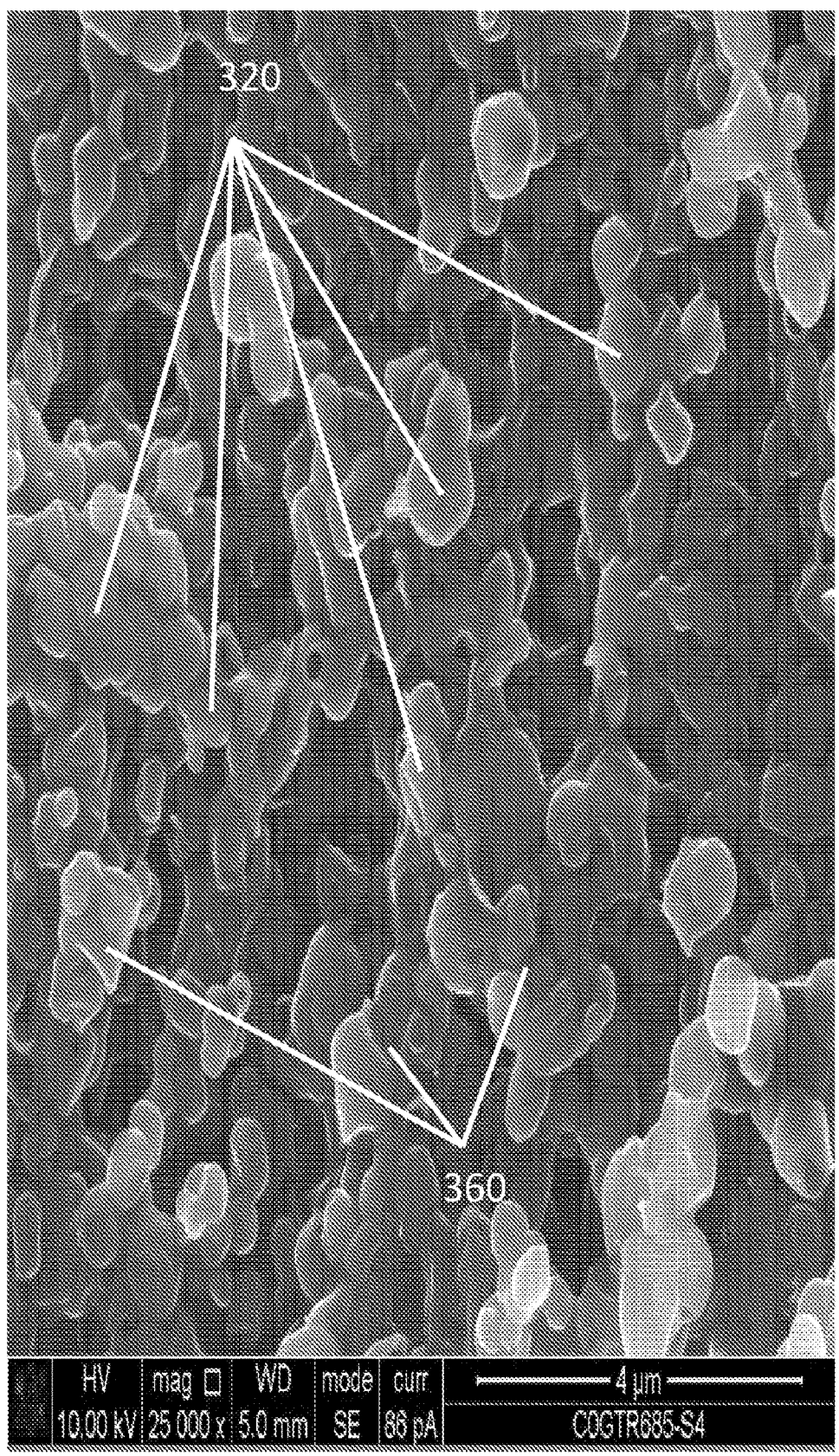
FIG. 13 is an SEM micrograph of a composite coating comprised of spheroidal cells coated with CPO.
Figure 14:
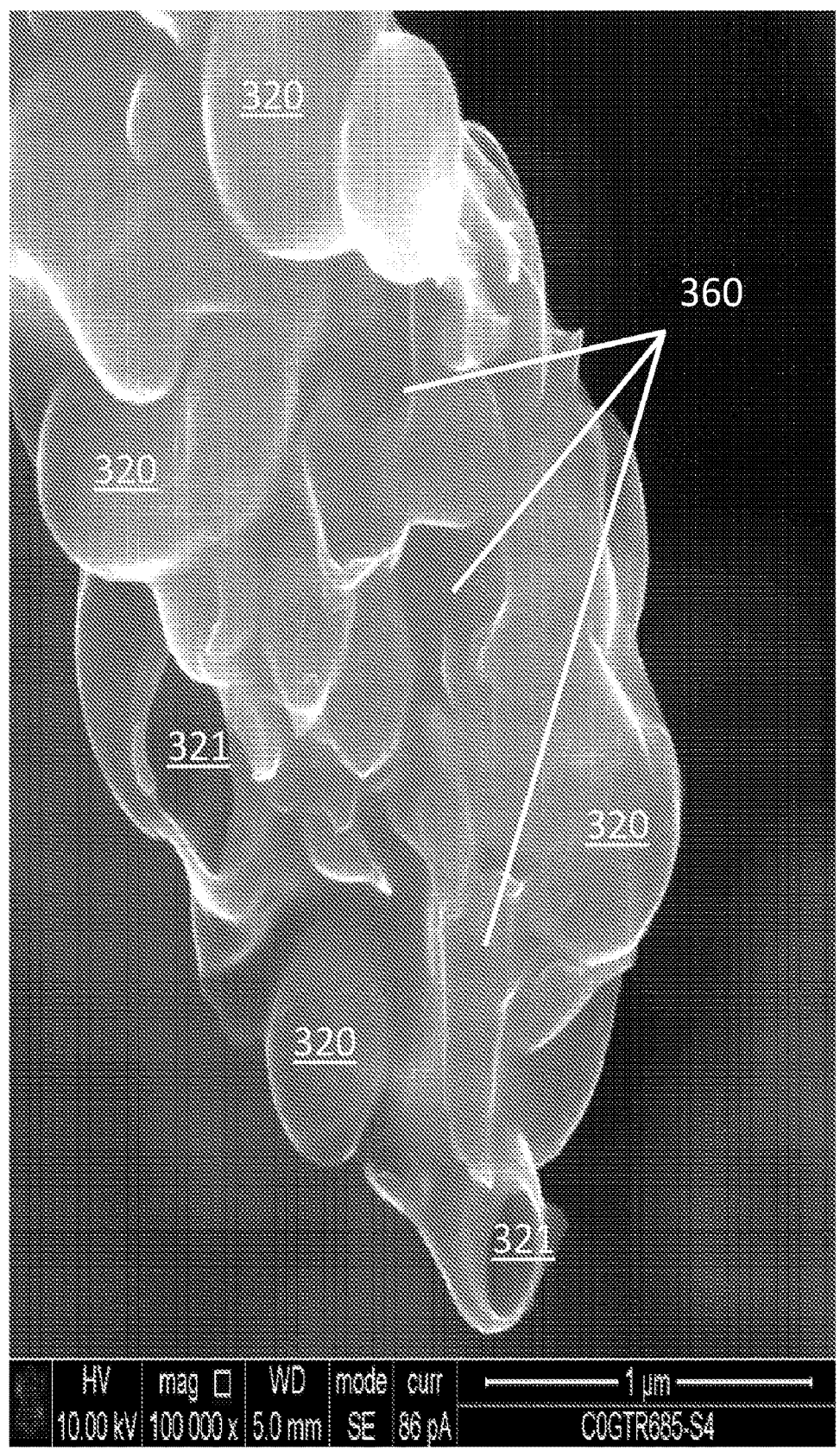
FIG. 14 is an SEM micrograph of a composite particle scraped from the dried C3 coating.

In still other embodiments, the composites of the above embodiments may be used as coatings. To create a composite coating of this embodiment, carbon powder may be slurried and dispersed in a solution of CPO and toluene (10:1 toluene by weight). The S3 powder may be 10% of the solids content of the composite materials. The liquid composite may then be applied as a thin coating over a metal substrate and allowed to dry at room temperature. FIGS. 13 and 14 show the results of an experiment to demonstrate the suitability of unimpregnated cellular carbon composites for coating applications. The powder used in this experiment was S3 and the coating created by it gill be referred to as "C3."

FIG. 13 shows an SEM micrograph of the composite coating C1. As shown in FIG. 13, the coating C3 includes regular spheroidal cells 320 packed together in a syntactic architecture and blanketed with CPO binder 360, mainly visible as a connective layer between neighboring cells 320 in a cluster. If the CPO binder 360 were not present, each cell 320 would be more distinct and separate, as, for example, the cells 320 shown in FIG. 5.

FIG. 14 shows a high-magnification micrograph of a composite particle scraped from the dried C3 coating shown in FIG. 13. The unimpregnated cavity structure of the cells 320 can be observed in ruptured cells 321. Other unimpregnated cavity structures embedded just below the surface of the CPO binder 360 can be discerned. It is likely that CPO is deposited both on the exohedral and endohedral cell surfaces, given the transverse pores present in the S3 cell walls, Nevertheless, volumetrically the cells are substantially unimpregnated, FIG. 14 also clearly shows the size scale of cells 320 are fractions of a micron in diameter. This cavity size scale is many times smaller than pores created by tradition material "foaming" methods, e.g., by creating foams by blowing bubbles in molten material. For example, a 100 nm diameter cellular carbon sphere has a volume that is one million times smaller than a 10 μm diameter gas bubble. A coating that is 1 mil in thickness may therefore hold numerous cellular carbon spheres instead of a just a few. Therefore, thin coatings of cellular carbon composites, especially those with syntactic architectures, may be advantageous.

Applicability

It is to be understood that the above-described cellular carbon composite material may have a number of applications beyond those explicitly described herein. Some additional exemplary applications include lightweight coatings that provide pressure-variable electrical or thermal conductivity properties. These applications may include damage or fatigue sensors and/or damage or fatigue sensing components on vehicles, such as aircraft or automobiles. Other applications may include ballistic sensing where, for example, the composites are incorporated into armor, military hardware, or other objects potentially exposed to ballistic impact. They may also include molded and/or coating composite applications in actuators or accelerometers for measuring, for example, motion or trajectory.

Control over the cell morphology in unimpregnated cellular carbons allows for more versatility in composite property engineering and application than typical means of foam formation (e.g., using glass bead templates). For example, unimpregnated cells packed together with sufficient density may form a syntactic architecture e.g., an arrangement of hollow, cellular particles packed densely enough to contact each other. Potential sizes and geometries of unimpregnated cellular carbons are numerous and varied. They range from spheroids to complex multicellular sheets and fibers. Smaller-diameter particles with nanostructured carbon walls may offer lower density and superior mechanical properties as compared to hollow glass. Unimpregnated cellular carbons may also be used to create highly electrically conductive syntactic architectures for applications benefiting from multi-functionality. Such composites may be useful for electromagnetic shielding, resistive heating, and piezoresistive sensing. Unimpregnated cellular carbon nanostructures may also be internally pressurized in order to improve their resistance to compression.

The preceding description of the disclosed examples is provided to enable any person skilled in the art to make or use the present examples. Various modifications to these examples will be readily apparent to those skilled in the art, and the generic principles defined herein may be applied to some examples without departing from the spirit or scope of the written description. Thus, the present disclosure is not intended to be limited to the examples shown herein but is to be accorded the widest scope consistent with the following claims and the principles and novel features disclosed herein.

The invention claimed is:

1. A composite, comprising: nanostructured carbon particles having a multicellular structure and a particle diameter of 1 mm or smaller, the multicellular structure comprising interconnected cell cavities, the cell cavities unfilled by a liquid or solid and enclosed by a network of bridged cell walls, the cell walls having a thickness of 100 nm or smaller and comprising $sp^2$-hybridized carbon; and a polymeric binder material binding the nanostructured carbon particles, wherein the polymeric binder being a thermoplastic polymer comprising at least one of the following: poly(methyl methacrylate), acrylonitrile butadiene styrene, polyamide, polylactic acid, polybenzimidazole, polycarbonate, polyether sulfone, polyoxymethylene, polyether ether ketone, polyetherimide, polyethylene, polyphenylene oxide, polphenylene sulfide, polypropylene, polystyrene, polyvinyl chloride, polytetrafluoroethylene, or copolymers thereof; and a composite density that is less than a density of the polymeric binder material.

2. The composite of claim 1, wherein: the cell walls have a thickness of 100 nm or smaller; the cavities have: a diameter of 10 nm or larger and an aspect ratio of less than 10:1; and the multicellular structures have a diameter of 1 mm or smaller.

3. The composite of claim 1, wherein the multicellular structure is formed via template-directed chemical vapor deposition.

4. The composite of claim 1, wherein less than 1 weight percent of the composite is the nanostructured carbon particles.

5. The composite of claim 1, wherein less than 10 weight percent of the composite is the nanostructured carbon particles.

6. The composite of claim 1, wherein less than 50 weight percent of the composite is the nanostructured carbon particles.

7. The composite of claim 1, wherein the nanostructured carbon particles are non-covalently bonded to the polymeric binder.

8. The composite of claim 1, wherein the composite has a diameter of less than 1 mm.

9. The composite of claim 1, wherein the nanostructured carbon particles are electrically conductive.

10. The composite of claim 1 having a density of 0.80 g/cm$^3$ or less.

11. The composite of claim 1 having a density of 0.50 g/cm$^3$ or less.

12. The composite of claim 1 having a compressive strength at 10% strain that is greater than a compressive strength at 10% strain of a nonporous material comprising only the polymeric binder.

13. The composite of claim 1 having a compressive strength at 10% strain that is more than 600% greater than a compressive strength at 10% strain of the polymeric binder.

14. The composite of claim 1 having a compressive modulus that is greater than a compressive modulus of a nonporous material comprising only the polymeric binder.

15. The composite of claim 1 having a specific compressive strength at 10% strain that is greater than a specific compressive strength at 10% strain of a nonporous material comprising only the polymeric binder.

16. The composite of claim 1 having a specific strength at 10% strain that is more than 790% greater than a specific strength at 10% strain of the polymeric binder.

17. The composite of claim 1 having a specific ultimate compressive strength that is more than 400% greater than a specific ultimate compressive strength of the polymeric binder.

18. The composite of claim 1 having a specific ultimate compressive strength that is more than 790% greater than a specific ultimate compressive strength of the polymeric binder.

19. The composite of claim 1 having a specific modulus that is greater than a specific modulus of a nonporous material comprising only the polymeric binder.

20. The composite of claim 1 having a specific modulus that is more than 810% greater than a specific modulus of the polymeric binder.

21. A film or coating, comprising:
nanostructured carbon particles having a multicellular structure and a particle diameter of 1 mm or smaller, the multicellular structure comprising interconnected cell cavities, the cell cavities unfilled by a liquid or solid and enclosed by a network of bridged cell walls, the cell walls having a thickness of 100 nm or smaller and comprising sp$^2$-hybridized carbon; and a polymeric binder material binding the nanostructured carbon particles, wherein the polymeric binder being a thermoplastic polymer comprising at least one of the following: poly(methyl methacrylate), acrylonitrile butadiene styrene, polyamide, polylactic acid, polybenzimidazole, polycarbonate, polyether sulfone, polyoxymethylene, polyether ether ketone, polyetherimide, polyethylene, polyphenylene oxide, polyphenylene sulfide, polypropylene, polystyrene, polyvinyl chloride, polytetrafluoroethylene, or copolymers thereof; and a composite density that is less than a density of the polymeric binder material.

22. The film or coating of claim 21, wherein: the cell walls have a thickness of 100 nm or smaller; the cavities have: a diameter of 10 nm or larger and an aspect ratio of less than 10:1.

23. The film or coating of claim 21, wherein the multicellular structure is formed via template-directed chemical vapor deposition.

24. A molded casting, comprising: nanostructured carbon particles having a multicellular structure and a particle diameter of 1 mm or smaller, the multicellular structure comprising interconnected cell cavities, the cell cavities unfilled by a liquid or solid and enclosed by a network of bridged cell walls, the cell walls having a thickness of 100 nm or smaller and comprising sp$^2$-hybridized carbon; and a polymeric binder material binding the nanostructured carbon particles, wherein the polymeric binder being a thermoplastic polymer comprising at least one of the following: poly(methyl methacrylate), acrylonitrile butadiene styrene, polyamide, polylactic acid, polybenzimidazole, polycarbonate, polyether sulfone, polyoxymethylene, polyether ether ketone, polyetherimide, polyethylene, polyphenylene oxide, polphenylene sulfide, polypropylene, polystyrene, polyvinyl chloride, polytetrafluoroethylene, or copolymers thereof; and a composite density that is less than a density of the polymeric binder material.

25. The molded casting of claim 24, wherein: the cell walls have a thickness of 100 nm or smaller; the cavities have: a diameter of 10 nm or larger and an aspect ratio less than 10:1, the multicellular structures have a diameter of 1 mm or smaller.

* * * * *